US012664802B2

(12) United States Patent　　(10) Patent No.:　US 12,664,802 B2

Lee　　(45) Date of Patent:　Jun. 23, 2026

(54) METHOD OF PROCESSING IMAGE OBTAINED FROM IMAGING DEVICE INTERLOCKED WITH COMPUTING APPARATUS AND SYSTEM USING THE SAME

(71) Applicant: Choong Ryul Lee, Yuma, AZ (US)

(72) Inventor: Choong Ryul Lee, Yuma, AZ (US)

( * ) Notice: Subject to any disclaimer, the term of this patent is extended or adjusted under 35 U.S.C. 154(b) by 0 days.

(21) Appl. No.: 18/843,192

(22) PCT Filed: Feb. 14, 2023

(86) PCT No.: PCT/KR2023/002098

§ 371 (c)(1),
(2) Date: Aug. 30, 2024

(87) PCT Pub. No.: WO2023/182658

PCT Pub. Date: Sep. 28, 2023

(65) Prior Publication Data

US 2025/0285460 A1　Sep. 11, 2025

(30) Foreign Application Priority Data

Mar. 22, 2022　(KR) ........................ 10-2022-0035465
Mar. 22, 2022　(KR) ........................ 10-2022-0178036

(51) Int. Cl.
*G06V 30/00* (2022.01)
*G06T 5/50* (2006.01)
*G06V 30/18* (2022.01)

(52) U.S. Cl.
CPC ............ *G06V 30/1801* (2022.01); *G06T 5/50* (2013.01); *G06T 2207/20221* (2013.01)

(58) Field of Classification Search
CPC .... G06V 30/10; G06V 10/82; G06V 30/1448; G06V 10/25; G06V 20/62; G06V 30/153;
(Continued)

(56) References Cited

U.S. PATENT DOCUMENTS 8,712,163 B1 * 4/2014 Osheroff ............ G06Q 30/0185
424/467
9,418,304 B2 * 8/2016 Koo ...................... G06V 10/809
(Continued)

FOREIGN PATENT DOCUMENTS

JP　　　H09-161043　　6/1997
JP　　　2010-231686　　10/2010
(Continued)

OTHER PUBLICATIONS

Korean Office Action for parent KR Application No. 10-2022-0035465 dated Jun. 14, 2022 (now KR Patent No. 10-2480238).
(Continued)

*Primary Examiner* — Li Liu

(57) ABSTRACT

A method of processing an image, performed by a computing apparatus including a processor, according to some exemplary embodiments of the present disclosure, may include: obtaining an image; obtaining, from the image, analysis information corresponding to an object included in the image by using an object analysis model; and obtaining, from the analysis information corresponding to the object, a character contained in the object by using an OCR model. The representative drawing may be FIG. 2.

12 Claims, 24 Drawing Sheets

(58) Field of Classification Search
CPC .... G06V 30/148; G06V 30/158; G06V 30/18;
G06T 7/136; G06T 11/60
See application file for complete search history.

(56) References Cited

U.S. PATENT DOCUMENTS

| | | | |
|---|---|---|---|
| 2001/0019636 A1 | 9/2001 | Slatter | |
| 2015/0254804 A1* | 9/2015 | Hasegawa | G06V 10/50 |
| | | | 345/660 |
| 2020/0320324 A1* | 10/2020 | Goncalves | G06V 30/1444 |
| 2023/0025548 A1* | 1/2023 | Ramaswamy Srinivasa | |
| | | | G06V 10/82 |
| 2023/0260308 A1* | 8/2023 | Reinpoldt, III | G06V 30/146 |
| | | | 382/177 |
| 2024/0144709 A1* | 5/2024 | Arroyo | G06V 30/153 |
| 2025/0014206 A1* | 1/2025 | Robinson, Jr. | G06V 10/62 |

FOREIGN PATENT DOCUMENTS

| | | | |
|---|---|---|---|
| KR | 10-2005-0008246 | | 1/2005 |
| KR | 10-2049051 | B1 | 8/2008 |
| KR | 10-2010-0007895 | A | 1/2010 |
| KR | 10-1072399 | B1 | 10/2011 |
| KR | 10-2012-0067890 | | 6/2012 |
| KR | 10-2019-0085464 | | 7/2019 |
| KR | 10-2019-0085719 | A | 7/2019 |
| KR | 10-2211516 | B1 | 2/2021 |
| KR | 10-2022-0006753 | A | 1/2022 |
| KR | 10-2480238 | B1 | 12/2022 |
| WO | 2015/008732 | A1 | 1/2015 |

OTHER PUBLICATIONS

International Search Report and Written Opinion for parent WO Application No. PCT/KR2023/002098 dated May 19, 2023 and English translation provided by the Office.
Extended European Search Report for related EP Application No. 23761742.8 dated Jul. 9, 2024.
Japanese Office Action dated Aug. 26, 2025 for correlating Japanese Patent Application No. 2024-556490.
Machine translation of Japanese Office Action dated Aug. 26, 2025 for correlating Japanese Patent Application No. 2024-556490.

* cited by examiner

[FIG. 1]
<u>100</u>
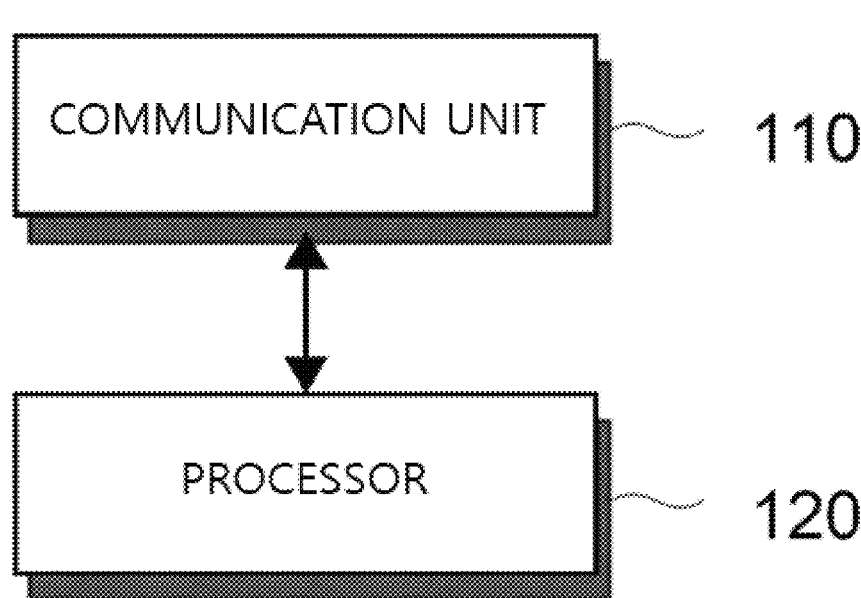

[FIG. 2]
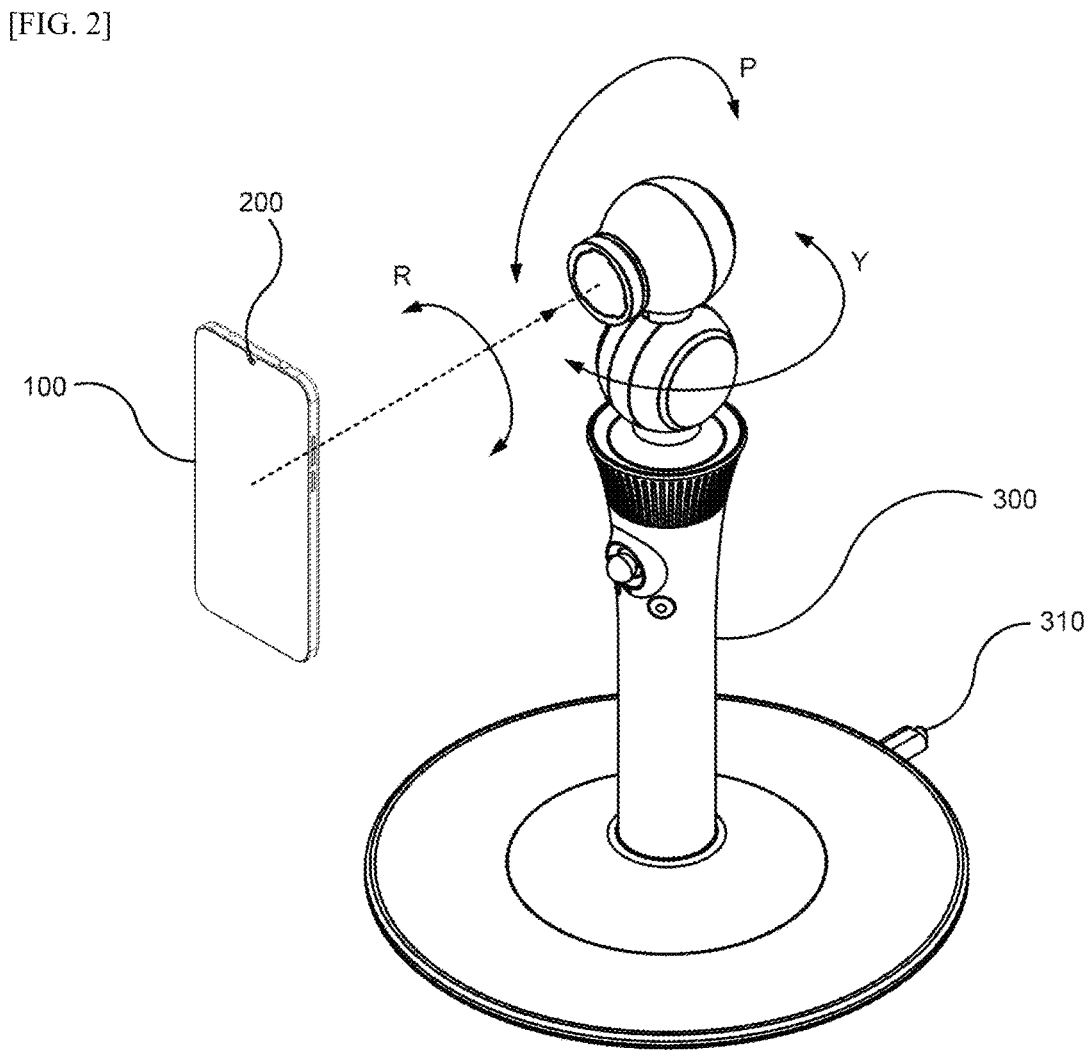

[FIG. 3]
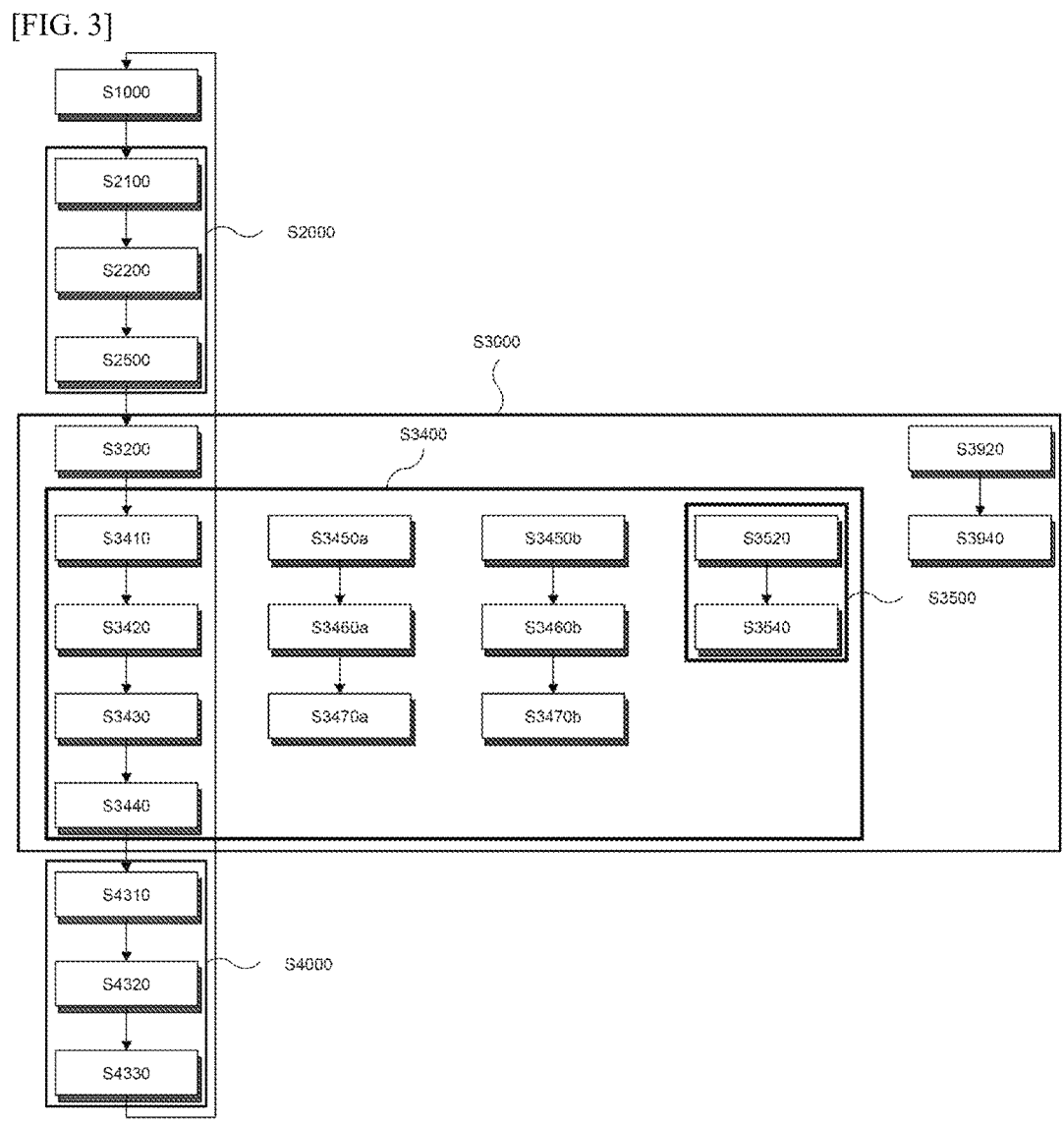

[FIG. 4]
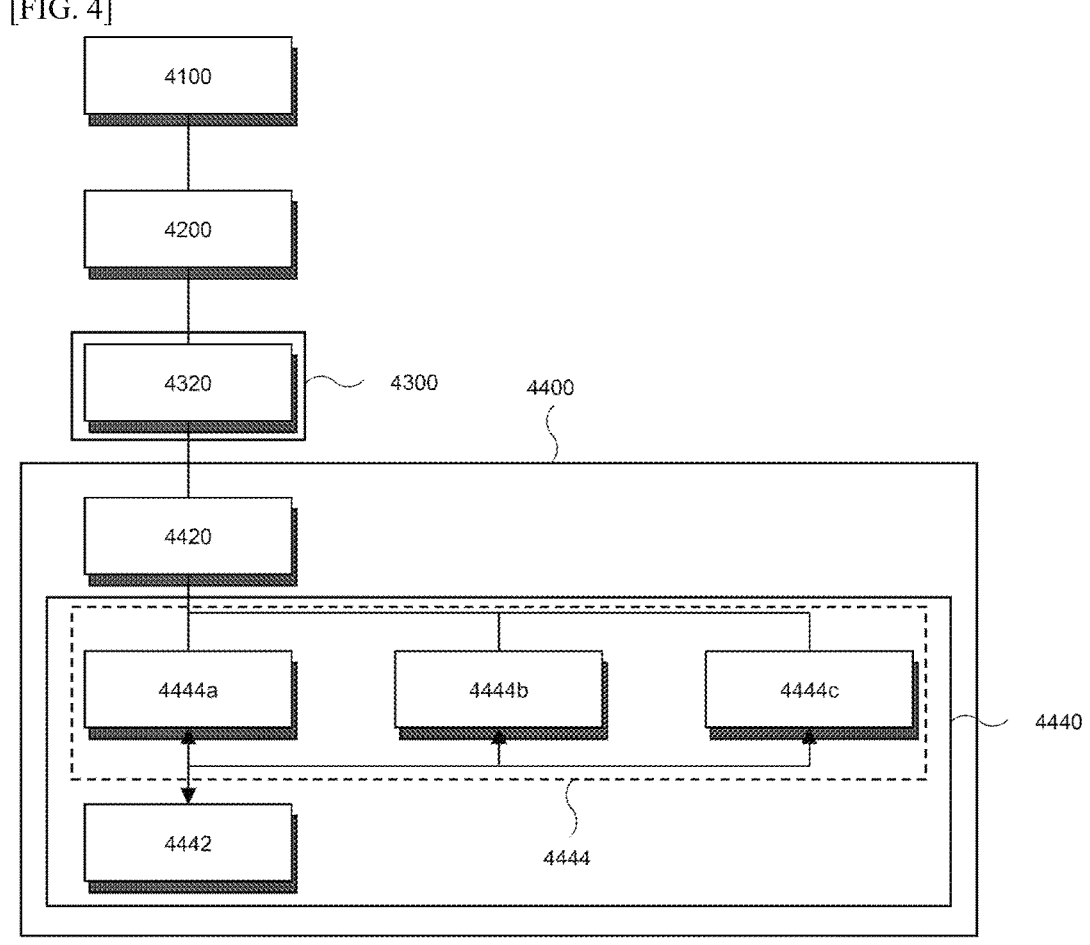

[FIG. 5]
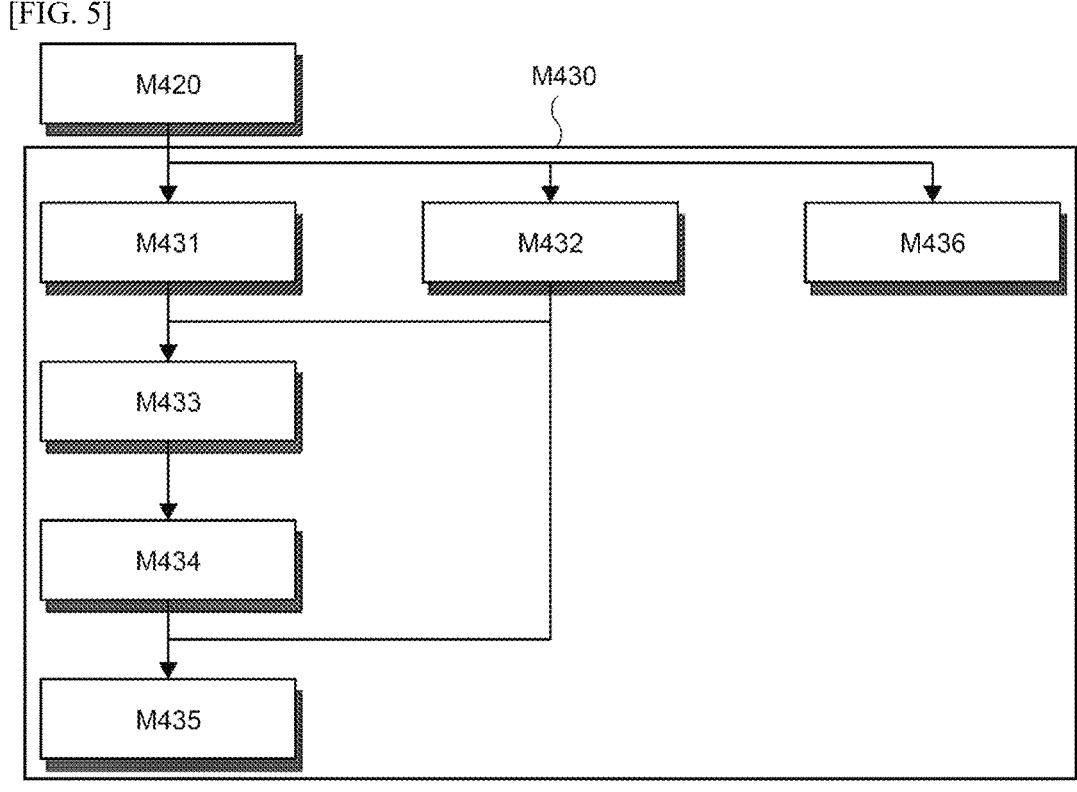

[FIG. 6a]
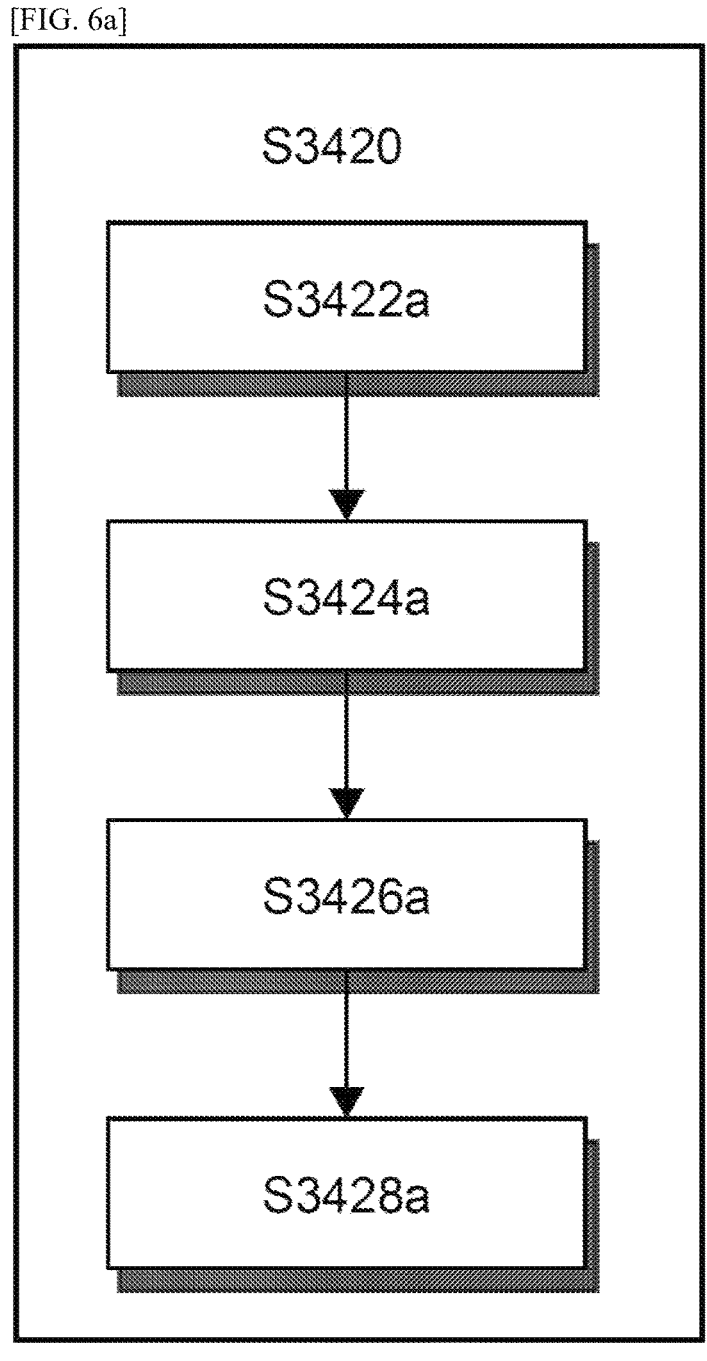

[FIG. 6b]
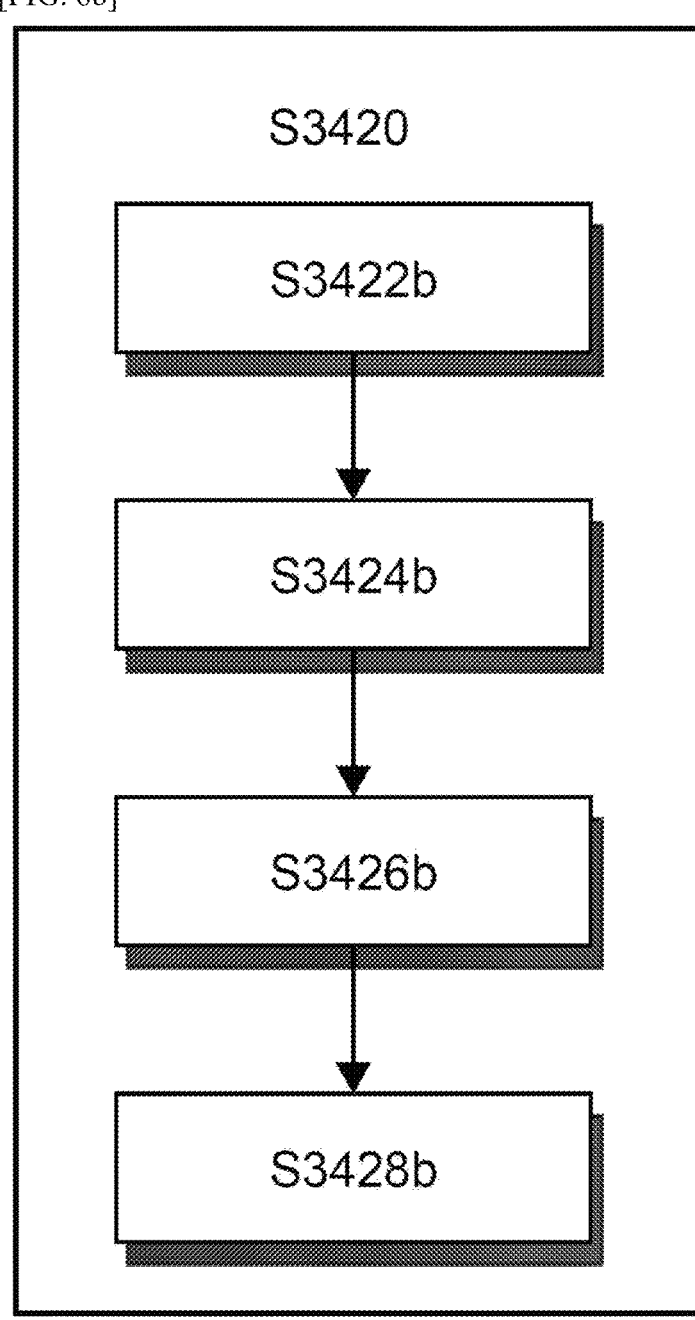

[FIG. 6d]
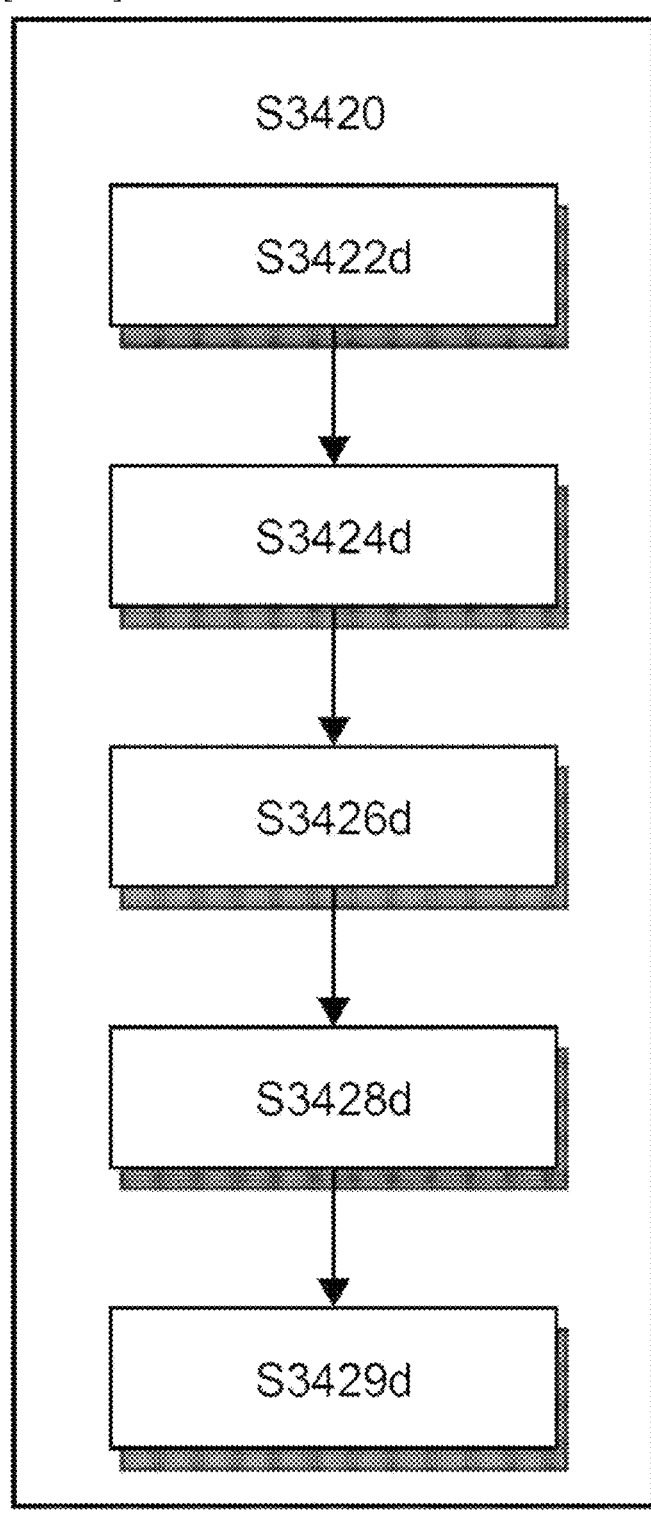

[FIG. 7a]
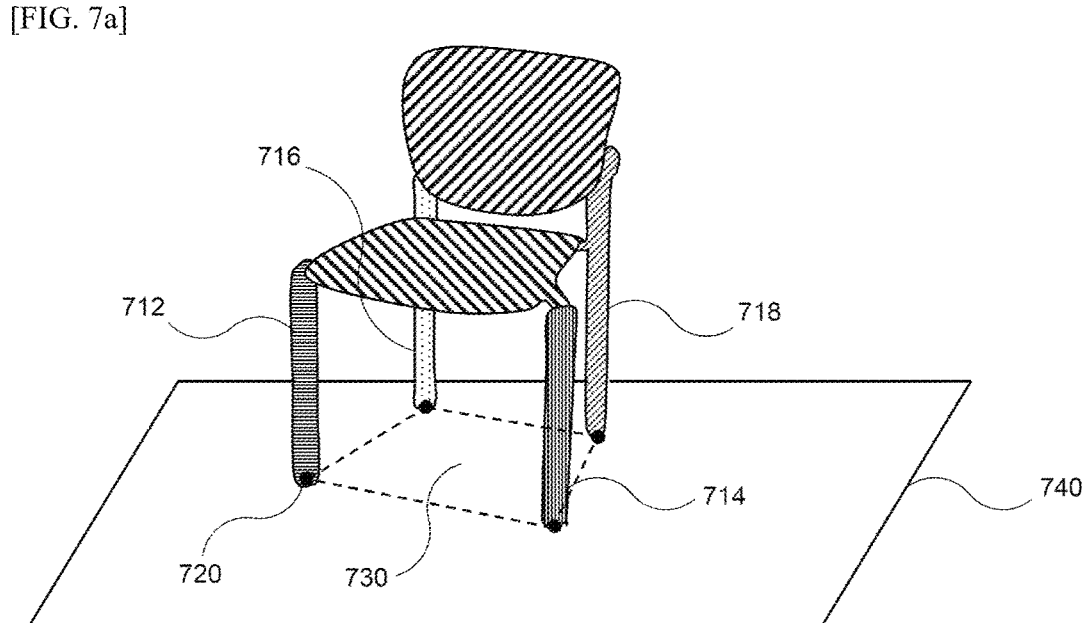

[FIG. 7b]
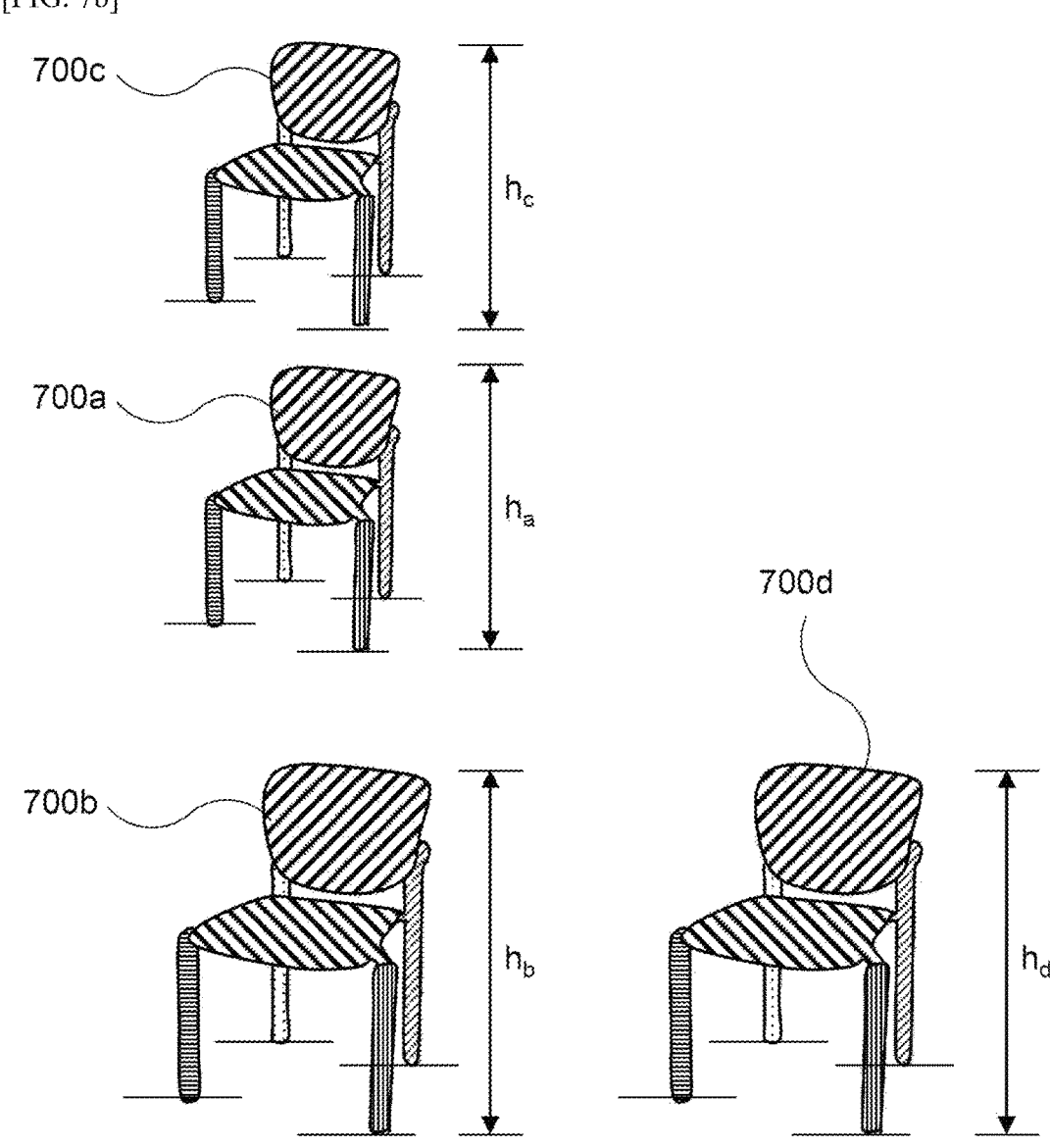

[FIG. 7c]
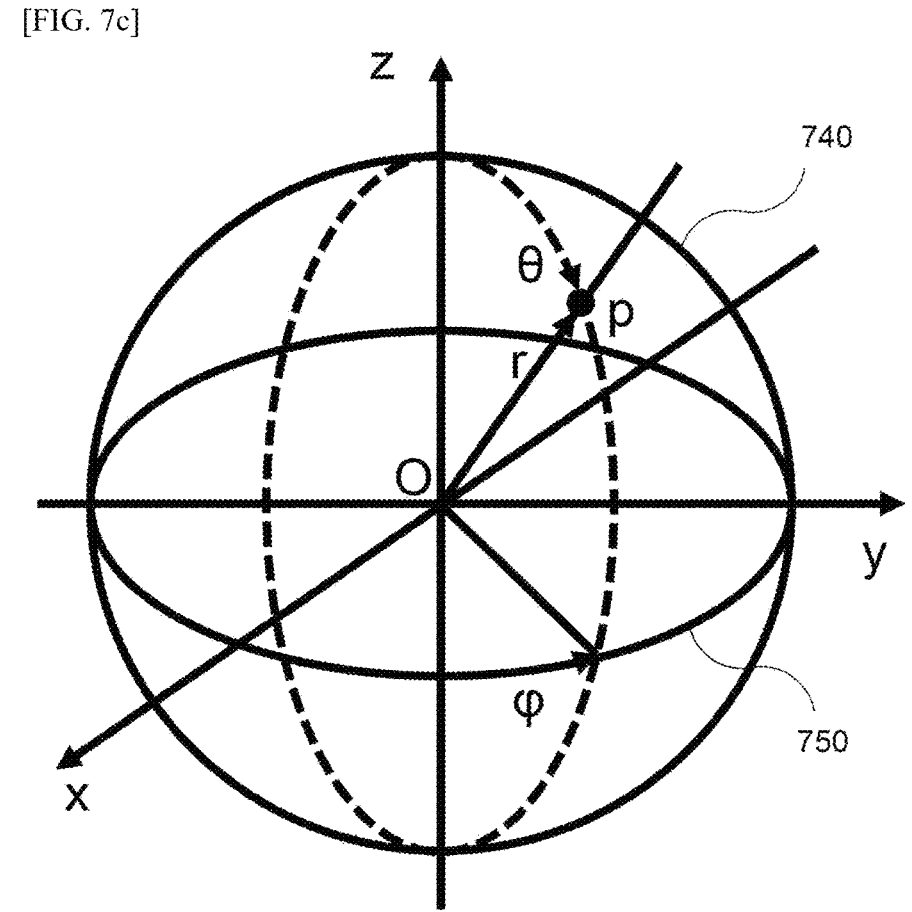

[FIG. 8a]
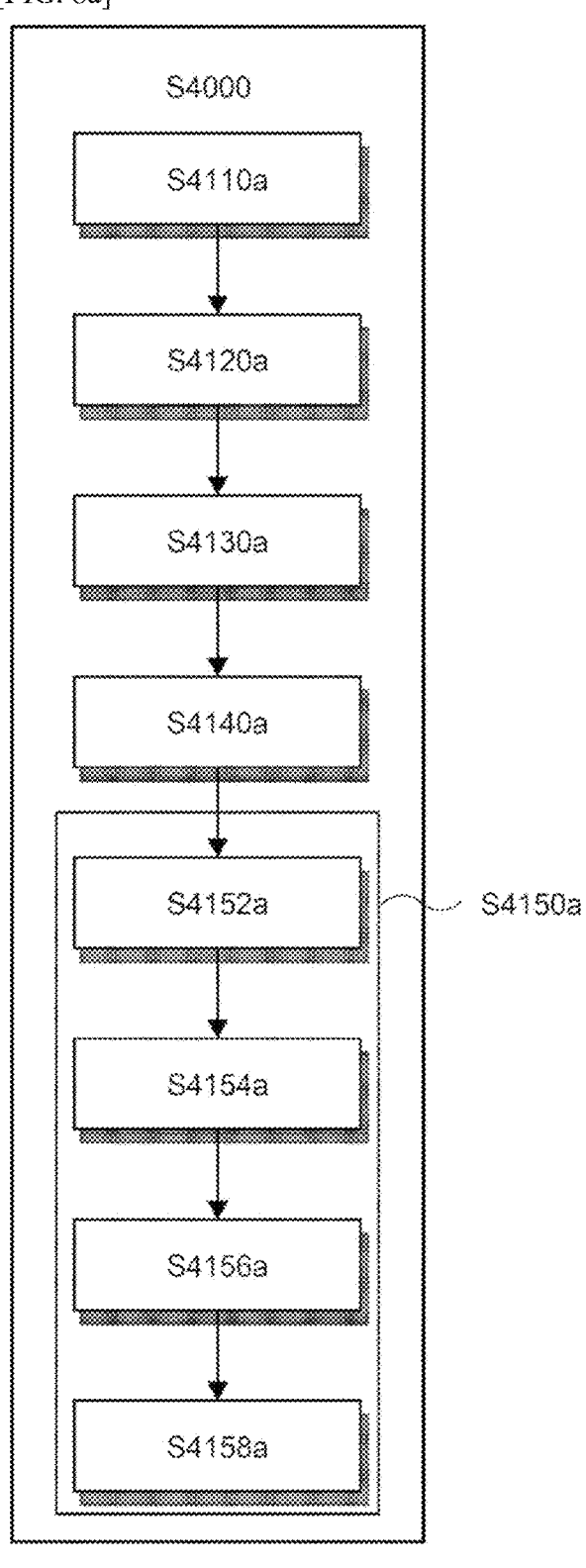

[FIG. 8b]
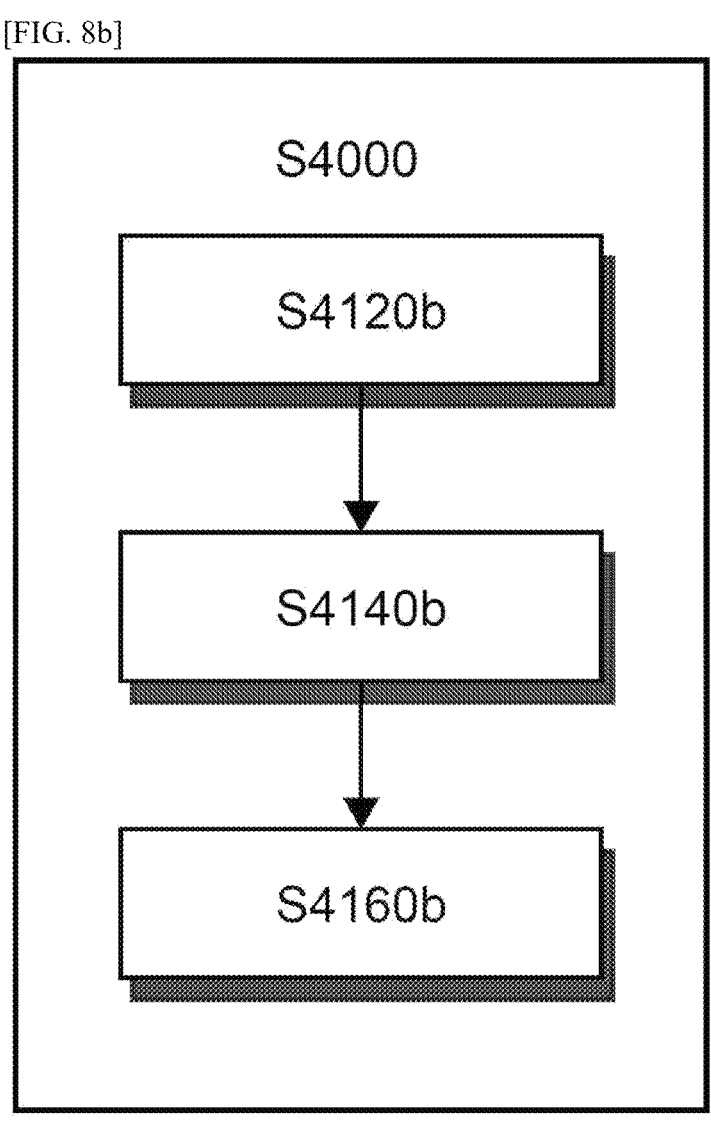

[FIG. 8c]
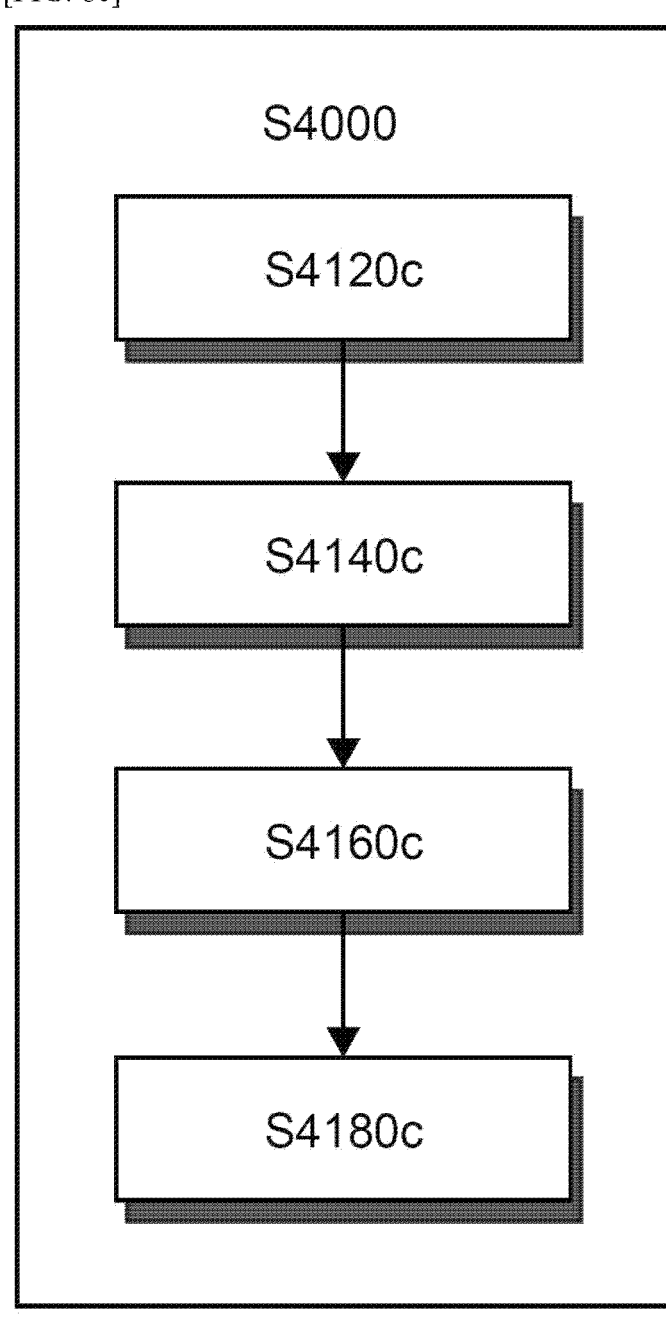

[FIG. 9b]
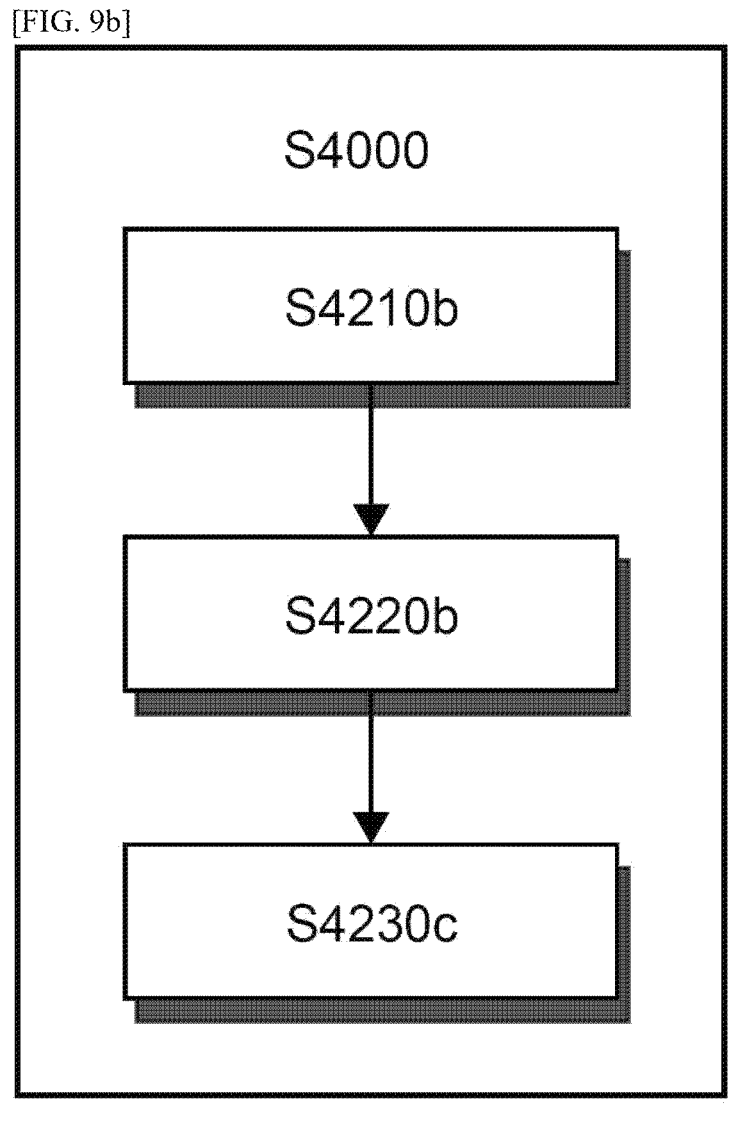

[FIG. 10a]

[FIG. 10b]
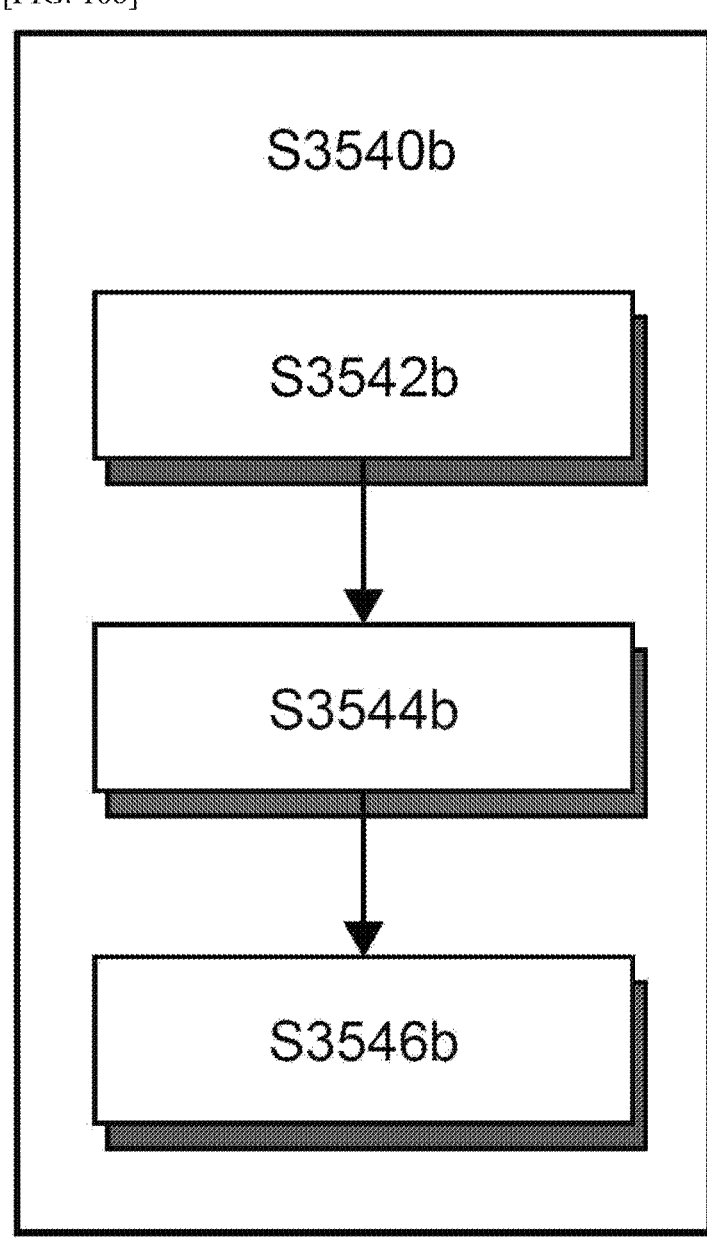

[FIG. 10c]
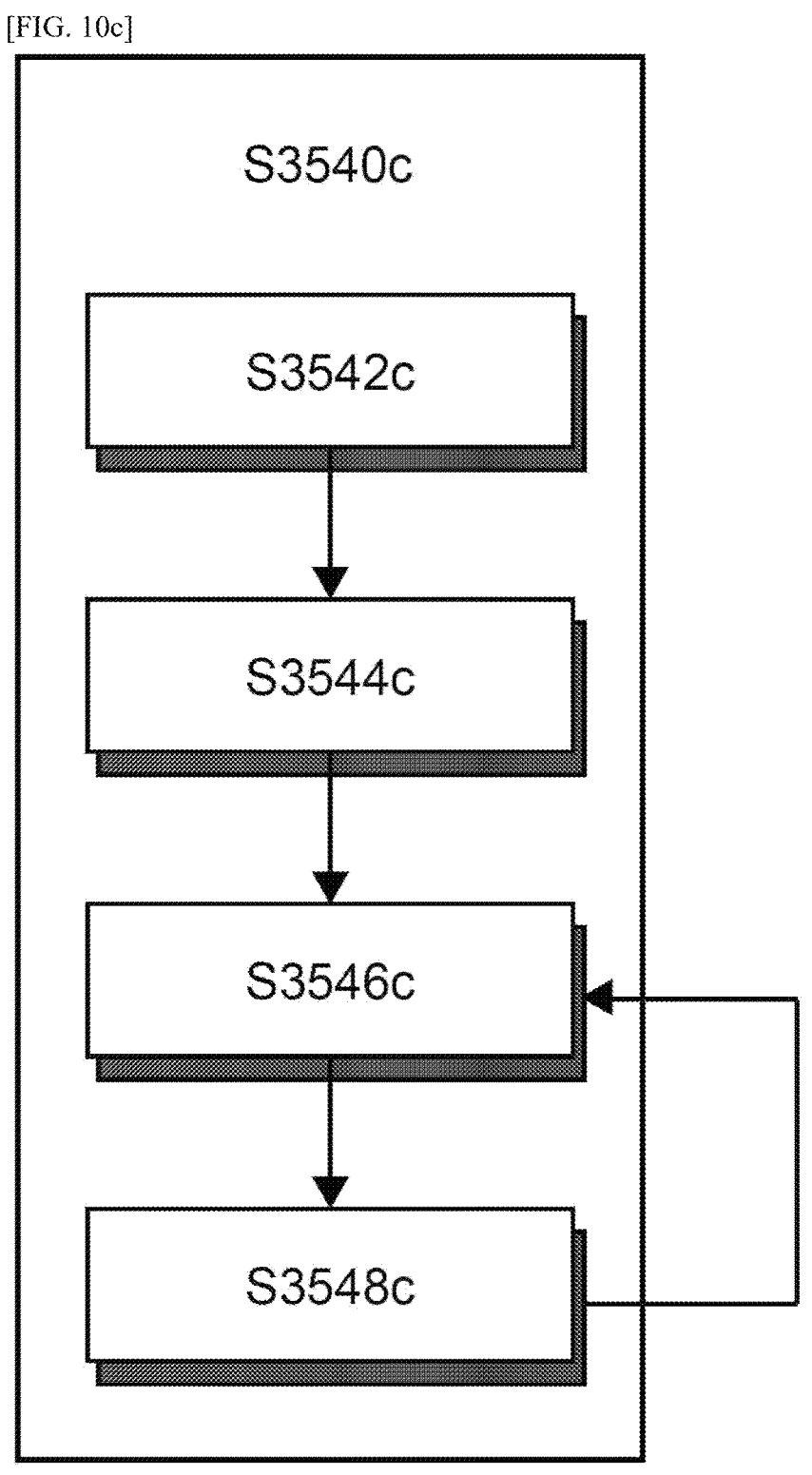

[FIG. 11a]

[FIG. 11b]
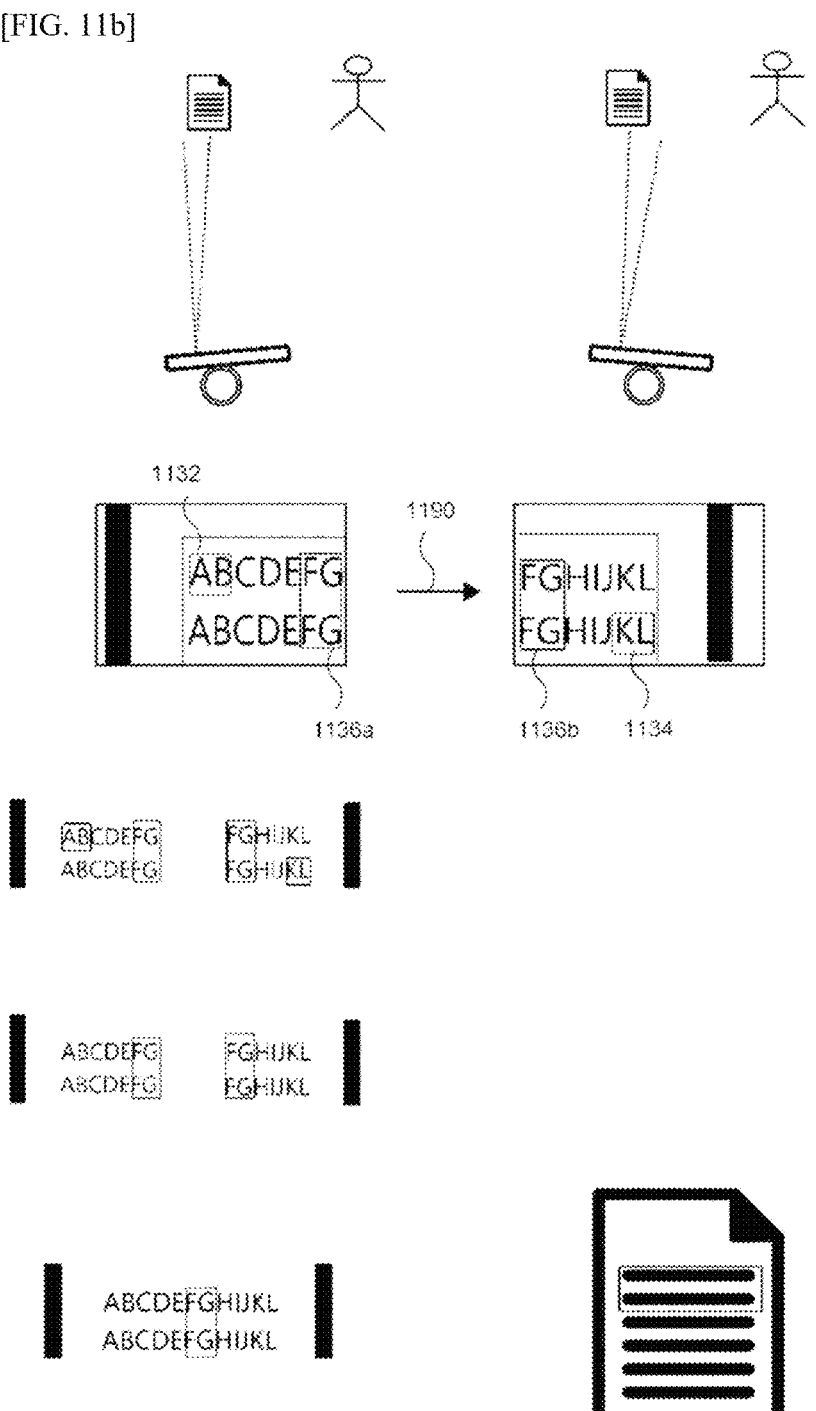

[FIG. 11c]
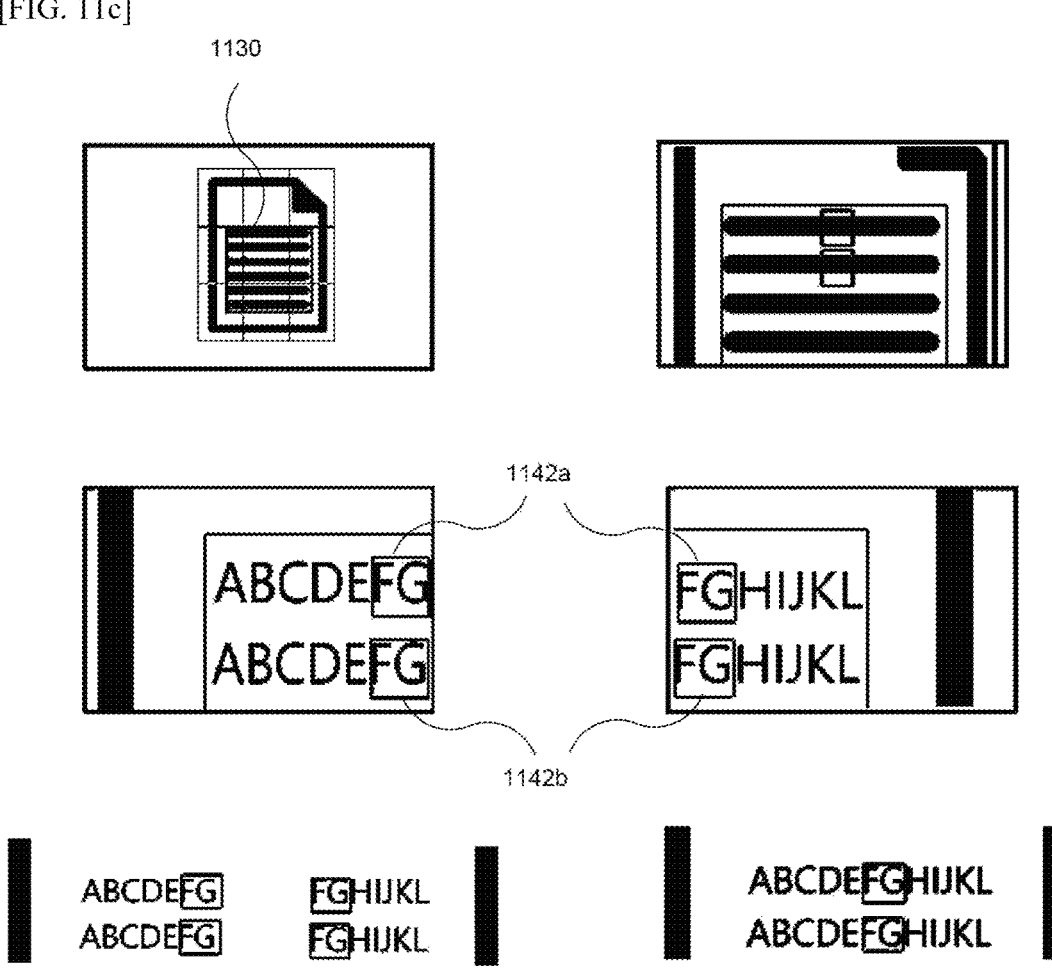

[FIG. 11d]
1152
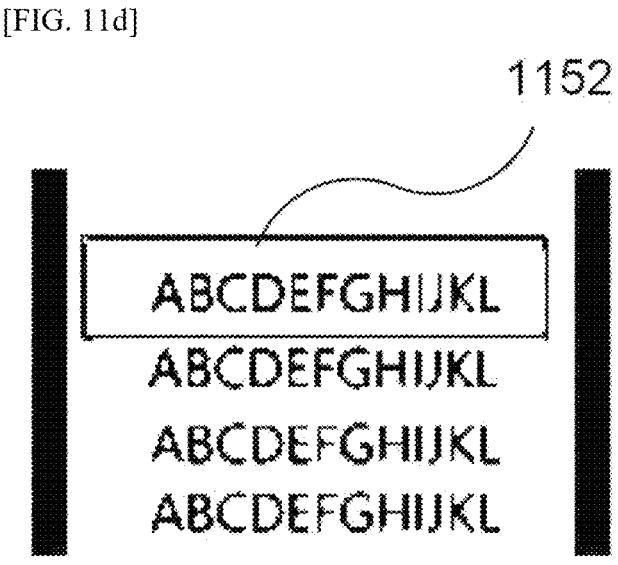
1154
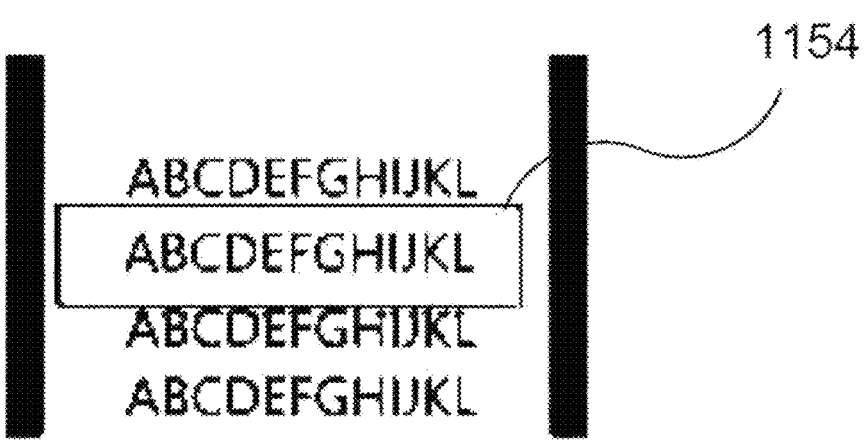

1

METHOD OF PROCESSING IMAGE OBTAINED FROM IMAGING DEVICE INTERLOCKED WITH COMPUTING APPARATUS AND SYSTEM USING THE SAME

TECHNICAL FIELD

The present disclosure discloses a method of processing an image obtained from an imaging device, and a system using the same. In particular, according to the method of the present disclosure, a computing apparatus obtains a full image from an imaging device integrated into the computing apparatus or interworking the computing apparatus, detects one or more objects appearing in the full image, performs classification for calculating a category of each of the detected objects, and generates detailed classification information including a property and a state of the object as a result of the analysis for each of the objects.

BACKGROUND ART

A portable computing apparatus generally refers to a device equipped with a processor, display, microphone, and speakers, some of which may be used as a portable terminal, a type of communication device. Portable terminals have traditionally received user commands through input devices, such as keypads and touch displays, that require user contact, but with the development of voice recognition technology and computer vision technology, the portable terminals may receive user commands from a remote distance through input devices, such as microphones and cameras, and interaction with the user according to the commands.

However, because portable computing apparatuses do not have self-mobility, their range of inputs and outputs is limited by their physical position.

As one example of a physical limitation of an input device equipped on a portable computing apparatus, a camera, which is a non-contact input device, is mounted on the front or back of a mobile phone and has a limited field of view, so that it is required for a user to manually change the composition (angle of view or field of view, FOV) after gripping the camera to capture the desired image. As another example of the physical limitations, a microphone mounted on a portable computing apparatus has reduced reception sensitivity depending on the direction of the sound source.

Not only inputs, but also outputs are limited by physical position, and in one example, a touch display which is an output device is typically attached to some of the six sides of the portable terminal having a shape close to a plane, so that users use the mobile phone with the touch display of the portable terminal facing the user's face after gripping the mobile phone. In another example, an infrared projector for obtaining a three-dimensional shape has the emission direction and angle of the infrared rays limited to one directional range of the portable terminal, so that the user has to adjust the emission direction according to the instructions after gripping the portable terminal. Further, in this regard, Korean Patent Application Laid-Open Nos. 10-2011-0032244, 10-2019-0085464, 10-2019-0074011, 10-2019-0098091, 10-2019-0106943, and 10-2018-0109499 have been conceived. Further, in this regard, (Non-Patent Literature 1) Y. Zhou et al., "Learning to Reconstruct 3D Manhattan Wireframes from a Single Image," 2019 IEEE/CVF International Conference on Computer Vision (ICCV), Seoul, Korea (South), 2019, pp. 7697-7706, doi: 10.1109/ICCV.2019.00779, (Non-Patent Literature 2) Shin, D., &

2

Kim, I. (2018). Deep Image Understanding Using Multilayered Contexts. Mathematical Problems in Engineering, 2018, 1-11. https://doi.org/10.1155/2018/5847460, (Non-Patent Literature 3) Mo, K., Zhu, S., Chang, A. X., Yi, L., Tripathi, S., Guibas, L. J., & Su, H. (2019). PartNet: A Large-Scale Benchmark for Fine-Grained and Hierarchical Part-Level 3D Object Understanding. In 2019 IEEE/CVF Conference on Computer Vision and Pattern Recognition (CVPR). IEEE. https://doi.org/10.1109/cvpr.2019.00100, (Non-Patent Literature 4) Babaee, M., Li, L., & Rigoll, G. (2019). Person identification from partial gait cycle using fully convolutional neural networks. Neurocomputing, 338, 116-125., (Non-Patent Literature 5) Muhammad, U. R., Svanera, M., Leonardi, R., & Benini, S. (2018). Hair detection, segmentation, and hairstyle classification in the wild. Image and Vision Computing, 71, 25-37. https://doi.org/10.1016/j.imavis.2018.02.001, (Non-Patent Literature 6) Mougeot, G., Li, D., & Jia, S. (2019). A Deep Learning Approach for Dog Face Verification and Recognition. In PRICAI 2019: Trends in Artificial Intelligence (pp. 418-430). Springer International Publishing. https://doi.org/10.1007/978-3-030-29894-4_34, (Non-Patent Literature 7) Raduly, Z., Sulyok, C., Vadaszi, Z., & Zolde, A. (2018). Dog Breed Identification Using Deep Learning. In 2018 IEEE 16th International Symposium on Intelligent Systems and Informatics (SISY). IEEE. https://doi.org/10.1109/sisy.2018.8524715, (Non-Patent Literature 8) Wu, Z., Yao, T., Fu, Y., & Jiang, Y.-G. (2017). Deep learning for video classification and captioning. In Frontiers of Multimedia Research (pp. 3-29). ACM. https://doi.org/10.1145/3122865.3122867, (Non-Patent Literature 9) Wu, C.-Y., Girshick, R., He, K., Feichtenhofer, C., & Krahenbuhl, P. (2020). A Multigrid Method for Efficiently Training Video Models. In 2020 IEEE/CVF Conference on Computer Vision and Pattern Recognition (CVPR). IEEE https://doi.org/10.1109/cvpr42600.2020.00023, (Non-Patent Literature 10) Ullah, A., Ahmad, J., Muhammad, K., Sajjad, M., & Baik, S. W. (2018). Action Recognition in Video Sequences using Deep Bi-Directional LSTM With CNN Features. IEEE Access, 6, 1155-1166. https://doi.org/10.1109/access.2017.2778011 have been conceived.

DISCLOSURE

Technical Problem

The purpose of the present disclosure is to provide a method for overcoming the limitations of the portable computing apparatus of the prior art with respect to image input, and provide a technical method of combining a gimbal with an image imaging device, such as a camera, interlocked with a portable computing apparatus, and allowing the computing apparatus to control the gimbal to rotate the image imaging device about one or more axis to more dynamically receive images and process the input images.

The purpose of the present disclosure is to solve the problems in the prior art, and provide an image processing method of allowing a remote input through an image in which an object in a photographed image obtained by a camera and the like in a portable computing apparatus is recognized and tracked, information about the object and an environment are actively obtained, and in particular, based on the image, relative position information and spatial information of the object are recognized in a coordinate system centered on a system of the present disclosure to check a position of the object in the space.

Technical Solution

In order to solve the foregoing technical problem, provided is a method of processing an image, performed by a computing apparatus including a processor, the method including: obtaining an image; obtaining, from the image, analysis information corresponding to an object included in the image by using an object analysis model; and obtaining, from the analysis information corresponding to the object, a character contained in the object by using an OCR model.

Alternatively, the OCR model may perform: determining whether a character is displayed on a surface of the object; and performing the OCR on the character when it is determined that the character is displayed on a surface of the object.

Alternatively, in claim 2, the performing of the OCR on the character may include: extracting at least one image sample from the object on which the character is displayed; determining a boundary line of an area in which a character is displayed from the at least one image sample; generating a character-displayed image based on at least one of boundary lines or boundary points that is a point belonging to the boundary line in the at least one image sample; and performing OCR on the character-displayed image.

Alternatively, the image sample may be an image pattern present at a position of at least one of boundary lines or boundary points; and the image pattern may include at least one of a partial character, a border of the character, a portion of the character, or backgrounds.

Alternatively, the generating of the character-displayed image based on at least one of boundary lines or boundary points that is the point belonging to the boundary line among in at least one image samples may include: obtaining, from the at least one image sample, image patterns located at least one of boundary lines or boundary points; and generating a character-displayed image that is an image including the boundary marker as a partial image included in the image of the object on which the character is displayed.

Alternatively, the boundary marker includes at least one of: a start marker that is an image pattern corresponding to a start character of the character; or an end marker that is an image pattern corresponding to an end character of the character.

Alternatively, the obtaining of, from the at least one image sample, the image patterns located at least one of boundary lines or boundary points as the boundary marker may include: obtaining a character image including the start marker and having a character recognition rate of at least a threshold value by using a tracking controller; and determining whether the character image includes the end marker.

Alternatively, the method may further include determining the character image as the character-displayed image when the character image includes the end marker.

Alternatively, the method may further include: when the character image does not include the end marker, obtaining an additional character image including a next marker of a last marker among the boundary marker included in the character image and having the character recognition rate of at least the threshold value by using the tracking controller; merging the additional character image into the character image to generate a merged character image; and determining the merged character image as the character-displayed image when the merged character image includes the end marker.

Alternatively, the performing of the OCR on the character may include: obtaining an image of the object including the start point of the character and having a character recognition rate of at least a threshold value by using a tracking controller; and performing the OCR on an initial sentence area of the image of the object; and calculating a first value of meaningfulness that is a numerical value of a meaningfulness by performing Natural Language Understanding (NLU) on a first text that is a primary result of the OCR.

Alternatively, the method may further include when the first value of meaningfulness is equal to or greater than the threshold value, determining the first text to be a result text that is a result of the OCR.

Alternatively, the method may further include: when the first value of meaningfulness is less than the threshold value, performing the OCR on a next sentence area of the initial sentence area; performing natural language understanding on a second text that is a primary result of the OCR, and calculating a second value of meaningfulness that is a numerical value of the meaningfulness; and when the second value of meaningfulness is equal to or greater than the threshold value, determining the second text to be a result text that is a result of the OCR.

Alternatively, the computing apparatus may be interlocked with an imaging device and a gimbal, and wherein obtaining the image comprise: controlling a direction of the imaging device by actuating one or more rotational axis of the gimbal by using a tracking controller; and obtaining the image by zooming in or zooming out of the imaging device by using the tracking controller.

In order to solve the foregoing technical problem, provided is a non-transitory computer-readable medium including a computer program, the computer program causing a computing apparatus to perform a method of processing an image, the method including: obtaining an image; obtaining, from the image, analysis information corresponding to an object included in the image by using an object analysis model; and obtaining, from the analysis information corresponding to the object, a character contained in the object by using an OCR model.

In order to solve the foregoing technical problem, provided is a computing apparatus, including: a processor; and a communication unit, in which the processor obtains an image, obtains, from the image, analysis information corresponding to an object included in the image by using an object analysis model, and obtains, from the analysis information corresponding to the object, a character contained in the object by using an OCR model.

Advantageous Effects

According to the exemplary embodiments of the present disclosure, it is possible to recognize and track one or more objects by using an image, actively obtain information about an object and an environment, in particular, to obtain state information of the object at a remote distance as an image, to determine an interacting object as an image, to obtain a detailed image of higher resolution for a portion of the object at a remote distance, and to recognize a character printed on an object or output by using other means, such as a display, at a remote distance, thereby achieving an effect of enabling a portable computing apparatus to make a remote input by using the image.

DESCRIPTION OF DRAWINGS

The following drawings, which are appended hereto for the purpose of illustrating exemplary embodiments of the present disclosure, are only a few of the exemplary embodiments of the present disclosure, and it will be apparent to those skilled in the art to which the present disclosure belongs (hereinafter referred to as "those skilled in the art") that other drawings may be obtained on the basis of these drawings without further effort leading to the disclosure.

FIG. 1 is a conceptual diagram schematically illustrating an exemplary configuration of a computing apparatus performing a method of processing an image by the computing apparatus (hereinafter referred to as the "image processing method") according to an exemplary embodiment of the present disclosure.

FIG. 2 is a conceptual diagram exemplifying an overall hardware and software architecture including a computing apparatus, an imaging device, and a gimbal as a system for performing an image processing method according to an exemplary embodiment of the present disclosure.

FIG. 3 is a flow diagram exemplifying the image processing method according to the exemplary embodiment of the present disclosure, and FIG. 4 is a block diagram exemplifying modules performing each operation of the image processing method according to the exemplary embodiment of the present disclosure.

FIG. 5 is a block diagram exemplifying machine learning models used in modules for the image processing method according to the exemplary embodiment of the disclosure.

FIGS. 6A to 6D are flow diagrams exemplifying methods that may be used to detect a floor plane of an object in the image processing method of the present disclosure.

FIG. 7A is an exemplary diagram exemplifying an object segmentation obtained by the image processing method according to the exemplary embodiment of the present disclosure.

FIG. 7B is an exemplary diagram for illustrating operations for detecting two or more floor planes in the image processing method according to the exemplary embodiment of the present disclosure.

FIG. 7C is a conceptual diagram for illustrating a method of generating and utilizing a reference plane circle and a measurement plane circle in the image processing method according to the exemplary embodiment of the disclosure.

FIGS. 8A to 8C are flow diagrams illustrating methods that may be used to determine a target position in the image processing method of the present disclosure.

FIGS. 9A and 9B are flow diagrams for exemplifying methods that may be used to control the orientation of an imaging device in the image processing method of the present disclosure.

FIGS. 10A to 10C are flow diagrams for exemplifying methods that may be used to perform OCR in the image processing method of the present disclosure.

FIGS. 11A to 11D are illustrative drawings for illustrating methods of performing OCR in the image processing method of the present disclosure.

BEST MODE

All prior art references cited in the present disclosure are incorporated by reference in their entirety as set forth herein. Unless otherwise defined, all terms used herein including technical or scientific terms shall have the same meaning as commonly understood by those skilled in the art. Terms defined in generally used dictionary shall be construed that they have meanings matching those in the context of a related art, and shall not be construed in ideal or excessively formal meanings unless they are clearly defined in the present specification.

For the following detailed description of the present disclosure, reference is made to the accompanying drawings, which illustrate by way of example of a specific exemplary embodiment in which the disclosure may be practiced, in order to make clear the objects, technical solutions, and advantages of the present disclosure. These exemplary embodiments are described in sufficiently detail to enable those skilled in the art to practice the present disclosure. In the following description with reference to the accompanying drawings, identical components are given the same reference numerals regardless of reference numeral, and duplicate descriptions are hereby omitted.

Specific structural or functional descriptions of the exemplary embodiments are disclosed for illustrative purposes only and the exemplary embodiments may be practiced with various modifications. Accordingly, the exemplary embodiments are not limited to a specific disclosure form, and the scope of the present specification includes modifications, equivalents, or substitutions included in the technical spirit.

Terms, such as "first" and "second", are used for describing various constituent elements, but the terms are used only to discriminate one constituent element from another constituent element, and do not imply any order. For example, the first constituent element may be referred to as the second constituent element, and similarly, the second constituent element may also be renamed as the first constituent element.

It should be understood that when one constituent element referred to as being "connected to" another constituent element, one constituent element may be directly coupled to or connected to the other constituent element, but intervening elements may also be present.

Singular expressions used herein include plurals expressions unless they have definitely opposite meanings in the context. In the present specification, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, operations, operations, constituent elements, and components, or a combination thereof in advance.

Also, a "part" or "portion" of a specific target may refer only to a part of the target, not the whole of the target, but should be understood to include the whole of the target unless the context indicates otherwise. A subset of a set is a concept that the subset includes the set itself.

In the present disclosure, "module" may refer to hardware capable of performing a function and an operation according to each name described in the present disclosure, computer program code capable of performing a specific function and operation, or a recording medium having computer program code capable of performing a specific function and operation. In other words, a module may refer to a functional and/or structural combination of hardware for carrying out the technical spirits of the present disclosure and/or software for driving the hardware.

Strictly speaking, a "model" refers to a function that is configured to produce output data from input data as trained by machine learning. Such a "model" may be used by the aforementioned "module" as a kind of data structure or function.

However, it has been found that some persons skilled in the artificial intelligence field are in the habit of using the terms "module" and "model" interchangeably, and accordingly, the terms "module" and "model" may be used interchangeably in the present disclosure because they are easily understood by persons skilled in the art without conceptual confusion between them.

In the present disclosure, the terms "training" and "learning" refer to performing machine learning through procedural computing, and are not intended to refer to mental operations, such as human educational activities. The term "machine learning" is often used to refer to a set of processes that generate a target function (f) that maps input variables (X) to output variables (Y) well, as it is commonly used in the field of statistics. Calculating an output variable from input variables by a target function is called "predicting," and "mapping well" means reasonably reducing the difference between a true value and a predicted value. The reason for reasonably reducing the difference, rather than just minimizing the difference, is that optimization may lead to the so-called overfitting problem, that is, poor predictions when real data that deviates from the training data is applied, and appropriate empirical means are devised to solve the problem.

In addition, in the present disclosure, the term "inference" is used to refer to the process of producing output data from input data by a machine-learned model, and in particular to a mechanical mimicry of human mental operations. Similarly, in the present disclosure, "analysis" by a machine is used to refer to a mechanical mimicry of human mental operations, similar to the inference.

In the present disclosure, a "Manhattan space" is used to refer to the same as disclosed in the paper, Y. Zhou et al., "Learning to Reconstruct 3D Manhattan Wireframes From a Single Image," 2019 IEEE/CVF International Conference on Computer Vision (ICCV), Seoul, Korea (South), 2019, pp. 7697-7706, doi: 10.1109/ICCV.2019.00779, which is non-patent literature.

Furthermore, the disclosure encompasses all possible combinations of the exemplary embodiments disclosed in the present disclosure. It is to be understood that the various exemplary embodiments of the present disclosure are different, but need not be mutually exclusive. For example, specific shapes, structures, and characteristics described herein may be implemented in other exemplary embodiments without departing from the spirit and the scope of the present disclosure in relation to one exemplary embodiment. Further, it should be understood that a position or disposition of an individual component in each disclosed exemplary embodiment may be changed without departing from the spirit and the scope of the present disclosure. Accordingly, the detailed description below is not intended to be taken in a limited meaning. Like reference numerals in the drawings refer to the same or similar functions over several aspects.

In this specification, unless otherwise indicated or clearly contradicted by the context, items referred to in the singular include the plural, unless the context otherwise requires. Further, in the following description of the present disclosure, a detailed description of known configurations or functions incorporated herein will be omitted when it is judged that the detailed description may make the subject matter of the present disclosure unclear.

In order to facilitate the practice of the present disclosure by those skilled in the art, exemplary embodiments of the present disclosure will be described in detail with reference to the accompanying drawings.

FIG. 1 is a conceptual diagram schematically illustrating an exemplary configuration of a computing apparatus performing an image processing method according to an exemplary embodiment of the present disclosure.

Referring to FIG. 1, a computing apparatus 100 according to an exemplary embodiment of the present disclosure includes a communication unit 110 and a processor 120, and may directly or indirectly communicate with an external computing apparatus (not illustrated) through the communication unit 110.

In particular, the computing apparatus 100 may achieve desired system performance by using a combination of typical computer hardware (for example, computers; devices that may include processors, memory, storage, input devices and output devices, and other components of existing computing apparatuses; electronic communication devices, such as routers and switches; electronic information storage systems, such as Network-Attached Storage (NAS) and Storage Area Networks (SAN)) and computer software (that is, instructions that cause the computing apparatus to function in a particular way). The storage may include the form of memory devices, such as hard disks, Universal Serial Bus (USB) memory, as well as network-connected storage devices, such as cloud servers. Herein, the memory may be, but is not limited to, DDR2, DDR3, DDR4, SDP, DDP, QDP, magnetic hard disk, and flash memory.

The communication unit 110 of the computing apparatus may transmit and receive requests and responses to and from other interlocked computing apparatuses, for example, portable terminals, and in one example, the requests and responses may be made in the same Transmission Control Protocol (TCP) session, but the present disclosure is not limited, and for example, requests and responses may also be transmitted and received as User Datagram Protocol (UDP) datagrams.

Specifically, the communication unit 110 may be implemented in the form of a communication module that includes a communication interface. For example, communication interfaces may include wireless Internet interfaces, such as Wireless LAN (WLAN), Wireless Fidelity (WiFi) Direct, Digital Living Network Alliance (DLNA), Wireless Broadband (WiBro), World interoperability for Microwave access (WiMax), High Speed Downlink Packet Access (HSDPA), 4G, 5G, and near field communication interfaces, such as Bluetooth™, Radio Frequency IDentification (RFID), Infrared Data Association; (IrDA), Ultra-WideBand (UWB), ZigBee, and Near Field Communication (NFC). In addition, a communication interface may represent any interface (for example, a wired interface) that can communicate with the outside world.

For example, the communication unit 110 may transmit and receive data from other computing apparatuses through a suitable communication interface. Furthermore, in a broad sense, the communication unit 110 may include or be interlocked with external input devices, such as a keyboard, mouse, touch sensor, input unit of a touch screen, microphone, video camera, or LIDAR, radar, switch, button, and joystick, for receiving commands or instructions, and external output devices, such as a sound card, graphics card, printing device, display, for example, a display unit of a touch screen. In order to display and provide an appropriate user interface to a user of a computing apparatus, such as a portable terminal, to enable interaction with the user, it is known that the computing apparatus 100 may include a display device or may be interlocked with an external display device through the communication unit 110. For example, the display device may be a touchscreen on which a touch input is possible. The touchscreen may detect an object, such as a finger or stylus pen, that is in contact with or proximate to the display capacitively, inductively, or optically, and may determine a position of the detected object on the display.

The input device may also include a microphone. Types of microphones may include dynamic microphones, condenser microphones, and the like, and a microphone having omni-directional, cardioid, or hypercardioid characteristic may be used. Beamforming microphones and microphone arrays may also be used, but are not limited to. A microphone array refers to two or more microphones used to detect the direction of a sound source.

The output device may also include a speaker. Types of speakers may include, but are not limited to, omnidirectional speakers, directional speakers, and ultra-directional speakers using ultrasound.

Further, the processor 120 of the computing apparatus may include a hardware configuration, such as a Micro Processing Unit (MPU), Central Processing Unit (CPU), Graphics Processing Unit (GPU), Neural Processing Unit (NPU), ASIC, CISC, RISC, FPGA, SOC chip, or Tensor Processing Unit (TPU), cache memory, data bus, and the like. Further, the processor 120 may also further include software configurations of operating systems, and applications that fulfill specific purposes. According to the exemplary embodiment of the present disclosure, the processor 120 may perform computations for training a neural network of various models. The processor 120 may perform a calculation, such as processing of input data for training in Deep Learning (DL), extraction of a feature from input data, an error calculation, and updating of a weight of the neural network by using backpropagation, for training the neural network. At least one of a CPU, a General Purpose Graphics Processing Unit (GPGPU), and/or a TPU of the processor 110 may process the learning of the network function. s For example, the CPU and the GPGPU may process learning of the network function and data classification by using a network function together. Further, in the exemplary embodiment of the present disclosure, the learning of the network function and the data classification by using a network function may be processed by using the processors of the plurality of computing apparatuses together. Further, a computer program executed in the computing apparatus 100 according to the exemplary embodiment of the present disclosure may be a CPU, GPGPU, or TPU executable program.

Throughout the present specification, a calculation model, a nerve network, the network function, and the neural network may be used with the same meaning. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weighted values set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, a Siamese network, and the like. The foregoing description of the deep neural network is merely illustrative, and the present disclosure is not limited thereto.

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weighted value of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

According to the exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing apparatus may perform a calculation while minimally using resources of the computing apparatus. In particular, the computing apparatus may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include other predetermined information determining a characteristic of the neural network. Further, the data structure may include all types of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning.) Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing apparatuses and converting the data structure into a form that may be reconstructed and used later. The computing apparatus may serialize the data structure and transceive the data through a network. The serialized data structure including the weight of the neural network may be reconstructed in the same or different computing apparatuses through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the computation while minimally using the resources of the computing apparatus. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

FIG. 2 is a conceptual diagram exemplifying an overall hardware and software architecture including a computing apparatus, an imaging device, and a gimbal as a system for performing an image processing method according to an exemplary embodiment of the present disclosure.

Referring to FIG. 2, overviewing the configuration of a method and an apparatus according to the present disclosure, the computing apparatus 100 may include an imaging device 200, or may be wirelessly or wiredly interlocked with an external imaging device 200, and the computing apparatus 100 may be wirelessly or wiredly interlocked with or include a gimbal 300 that performs a function to control the posture of the imaging device 200. To control the posture of the imaging device 200, the gimbal 300 may include a predetermined mechanism (for example, a suction plate) which includes the imaging device 200 or is capable of fixing the imaging device 200.

To control the posture of the imaging device, the gimbal 300 may have one or more axis of rotation, examples of which can be found in Korean Patent Application Laid-Open No. 10-2019-0036323. The gimbal 300 may actively improve an input range of the imaging device 200 through posture control.

When the gimbal 300 has one axis of rotation, the axis of rotation may be the yaw axis (Y). The yaw axis allows the imaging device 200 to interact with objects in the space with minimal rotation.

When the gimbal 300 has two axis of rotation, the axis of rotation may be a yaw axis and a pitch axis (P). Additionally, when the gimbal 300 has three axis of rotation, the axis of rotation may be a yaw axis, a pitch axis, and a roll axis R.

The gimbal 300 may include a power supply unit 310 as a component of hardware thereof. The power supply unit 310 may receive external power by wired or wireless means, and by direct or alternating current. Power supplied to the power supply unit 310 may be used by the gimbal 300 or the computing apparatus 100. Additionally, the power supply unit 310 may be used to charge a battery embedded in the gimbal 300 or a battery embedded in the computing apparatus.

Additionally, the gimbal 300 may include at least one gimbal motor 330 (not illustrated) as a component of hardware thereof. Each of the gimbal motors 330 is configured to change the direction of the imaging device 200 or the computing apparatus 100 on which the imaging device 200 is embedded according to the aforementioned axis of rotation, and the gimbal motor 330 may be, but are not limited to, a DC motor, an operation motor, and a brushless motor. The gimbal 300 may further include a gimbal motor 330 as well as a gear for converting the torque of the motor.

The motors 330 of the gimbal 300 are intended to orient the imaging device 200 attached to the gimbal or the computing apparatus 100 toward a particular object, so that it will be readily understood by those skilled in the art that the axis of rotation of each gimbal is preferably arranged to be parallel to respective axis of the imaging device 200 or computing apparatus 100, such as, but not limited to, yaw, pitch, and roll axis.

The gimbal 300 may further include at least one sensor 340 (not illustrated) as a hardware component thereof. The sensor 340 may perform a function of detecting one or more of position, angular position, displacement, angular displacement, speed, angular speed, acceleration, and angular acceleration with respect to a fixed portion of the gimbal 300 or the motor 330, and types of the sensor 340 may include, but are not limited to, acceleration sensors, magnetic sensors such as gyro sensors, geomagnetic sensors, Hall sensors, pressure sensors, infrared sensors, proximity sensors, motion sensors, photosensitive sensors, image (video) sensors, GPS sensors, temperature sensors, humidity sensors, barometric pressure sensors, LIDAR sensors, and the like.

The sensor 340 that cannot be mounted on the computing apparatus 100 due to limitations on the weight and volume of the computing apparatus 100, particularly, the portable computing apparatus, may be mounted on the gimbal 300, and the sensor 340 may be used to obtain information about the environment around the gimbal 300.

Figure 6C:
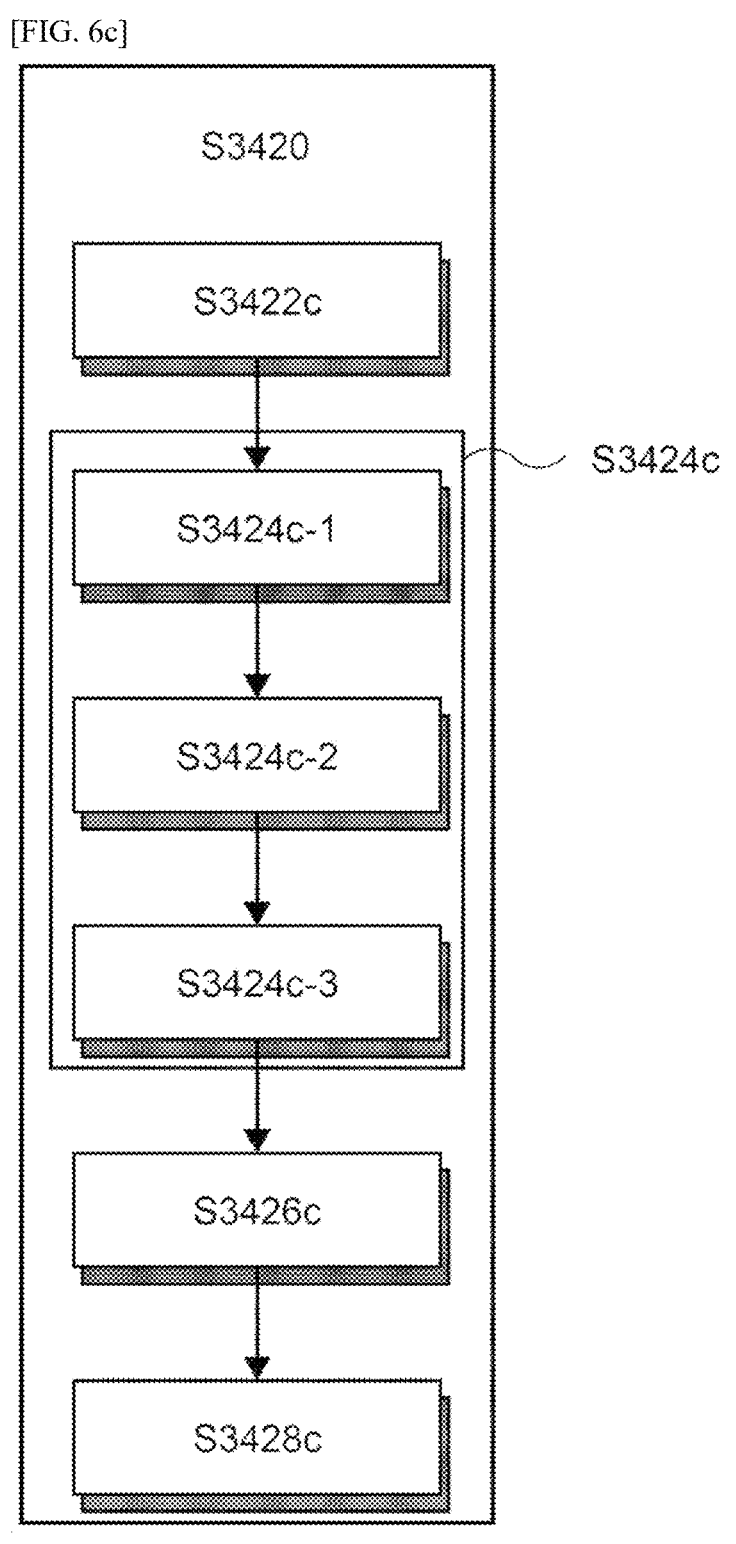

The specific functions and effects of the present disclosure that may be achieved by the individual components schematically described with reference to FIG. 2 will be described in detail with reference to FIGS. 3 to 11D. While the components illustrated in FIG. 2 are illustrated as being realized on a single computing apparatus for ease of description, it will be understood that the computing apparatus 100 performing the method of the present disclosure may be configured so that a plurality of devices is interlocked with each other. For example, the gimbal 300 may be configured to be an independent computing apparatus such that the gimbal 300 and the computing apparatus 100, such as a portable computing apparatus such as a portable terminal, may be interlocked with each other, and in this case, the gimbal 300 may perform at least some of the functions performed by the portable terminal 100. In other words, those skilled in the art would be able to configure a plurality of devices to be interlocked with each other to perform the method of the present disclosure in a variety of ways.

FIG. 3 is a flow diagram exemplifying the image processing method according to the exemplary embodiment of the present disclosure, and FIG. 4 is a block diagram exemplifying modules performing each operation of the image processing method according to the exemplary embodiment of the present disclosure. Further, FIG. 5 is a block diagram exemplifying machine learning models used in modules for the image processing method according to the exemplary embodiment of the disclosure.

Referring to FIG. 3, the image processing method according to the present disclosure first includes an image acquisition operation S1000 in an image input module 4100 implemented by the computing apparatus 100 obtains a full image from the imaging device 200 included in the computing apparatus 100 or interlocked with the computing apparatus 100 through the communication unit 110 of the computing apparatus 100.

In this context, "full image" refers to an image contrasted to an image corresponding to a part of the full image, such as an object image, as described later.

Next, the image processing method further includes a category classification operation S2000, in which an object analysis module 4200 implemented by the computing apparatus 100 detects one or more objects appearing in the full image, and performs a classification to calculate a category for each of the detected objects.

In this context, a category of an object refers to the result of classifying the object as a person, tree, dog, and the like.

In the category classification operation S2000, simultaneously with the classification, the position of each of the one or more objects in the full image may be calculated as part of the two-dimensional measurement.

The difference between the two-dimensional measurement and the three-dimensional measurement described later is that the two-dimensional measurement is based on the two-dimensional coordinate system of the image without considering the three-dimensional depth information, while the three-dimensional measurement takes into account the depth information as well as the two-dimensional coordinates of the image.

Specifically, the category classification operation S2000 may include an operation S2100 of resizing the full image to a resolution lower than the original resolution of the full image, and an operation S2200 of inputting the resized image into an object analysis model M420 to calculate a category, position, and importance of each of the objects.

For example, the processor 120 of the computing apparatus 100 may obtain, from the image, analytical information corresponding to objects included in the image by using the object analysis model M420. The analysis information may include at least one of classification information indicating a category of the object, position information indicating a position of the object, and/or importance information indicating a priority of the object within the image.

The object analysis model M420 is a model for performing analysis on objects included in the image, and may include an object classification model, a localization model, an object detection model, a segmentation model, and the like.

According to the exemplary embodiment of the present disclosure, the processor 120 may distinguish between classes of objects in the image given as input by using the object analysis model M420 that performs object classification. For example, when there is a person in the image given as input, the processor 120 may obtain the output "the type of input image is a person" for the input image by using the object analysis model M420. The foregoing is by way of example only, and this disclosure is not limited thereto.

According to the exemplary embodiment of the present disclosure, the processor 120 may also output position information indicating where an object in the image is located in the image by using the object analysis model M420 that classifies and localizes objects. For example, the processor 120 may recognize an object in the image and output position information by using a bounding box when the object analysis model M420 that classifies and localizes objects is used. A bounding box may return the position of an object by outputting the left, right, top, and bottom coordinates of the box. The foregoing is by way of example only, and this disclosure is not limited thereto.

According to the exemplary embodiment of the present disclosure, the processor 120 may detect at least one object by using the object analysis model M420 that detects an object. The processor 120 may simultaneously classify and localize at least one object by using the object analysis model M420 that detects an object to detect multiple objects and extraction position information. The foregoing is by way of example only, and this disclosure is not limited thereto.

According to the exemplary embodiment of the present disclosure, the processor 120 may detect objects by classifying pixels by using the object analysis model M420 that performs segmentation to distinguish a boundary of the line of the object in the image from the background. The foregoing is by way of example only, and this disclosure is not limited thereto.

It is well known to those skilled in the art that resizing, such as in operation S2100, is intended to improve the processing speed of the object analysis module 4200 by reducing the amount of computation by the object analysis model M420.

The importance that is the result of operation S2200 may be used as a measure to determine a priority of the object, such that higher priority objects may be given higher importance, and/or lower priority objects may be given lower importance. The priority will be described later in detail.

For an object whose importance is equal to or greater than a predetermined threshold value, the computing apparatus 100 may extract and sample an object image, which is an image of the object, from the full image {crop feed operation; S2500}. Since the resized image is used in operation S2200 and some data from the full image is lost, the cropped feed operation S2500 is intended to make available the image information before the loss for the object having relatively high importance.

Continuing to refer to FIG. 3, the image processing method according to the present disclosure further includes a detailed classification operation S3000 in which a detailed classification module 4300 implemented by the computing apparatus 100 generates detailed classification information including a property and a state of the object as the analysis result for each of the detected objects.

Here, an object is a concept that includes a spatial object, which is an object corresponding to the "space" itself in which the full image was taken, and the detailed classification information of the spatial object may include information about the corresponding space.

Property and State of the Object

A property of the object refers to a property of the object that is largely invariant over time, while a state of the object refers to a property of the object that is largely changeable over time.

Specifically, the property of the object may include information about a partial object that forms a part of the object or is a constituent element attributed to the object. For example, when a person is detected as an object in the full image, parts of the person's arms, legs, eyes, and/or the like and the clothes and/or shoes the person is wearing are partial objects of the object.

For the detection of the partial objects, the detailed classification operation S3000 may include operation S3920 of attempting to detect partial objects that form parts of the object or that are attributed constituent elements of the object; and, operation S3940 of, when the partial object is detected, further generating an analysis result of a property and a state of the partial object as a part of the detailed classification information.

Further, the property of the object may include at least one of the following: a main color of the object, a sub-object, which is information referring to the partial object of the object, a subject, which is information referring to another object when the object is a partial object of another object, a size of the object, one or more materials of the object including a main material of the object, a transparency of the object, text appearing on a surface of the object, and/or whether the object is self-movable.

Here, the size of the object may be the size measured by two-dimensional or three-dimensional measurement. In addition, the transparency of the object is a property that the object may have when the object is an object having transparent parts, such as a glass window, and for example, an opaque object may have a value of 0, and/or an object made of a transparent material, such as glass, may have a positive value.

Meanwhile, the state of the object may include at least one of a position of the object, a posture of the object, an action of the object, a direction of the object, whether the object is in contact with a floor, and/or a speed of the object.

Here, the position of the object may be a position measured by two-dimensional or three-dimensional measurement. The posture of the object may be inferred from the position information of the partial objects of the object, and the action of the object may be inferred from the temporally consecutive postures of the object.

Further, the direction of the object may be inferred from the position information of the object or the action of the object.

Whether the object is in contact with the floor indicates whether the object is in contact with the floor plane of the spatial object to which the object belongs, and for example, a chair, a desk, a telegraphy pole, and/or a car tire have the value true.

The detailed classification information of the object may further include an attribute referring to information related to system input/output of the object as well as the property and the state. The attributes of the object may include at least one of a data entry time including a time at which the raw data of the object was first entered, and/or an authorization to operate the system according to the present disclosure granted to the object.

In order to generate the detailed classification information of the object, the detailed classification operation S3000 may include: operation S3200 of selecting a detailed classification model M430, which is a set of models formed of at least one model pre-trained to adapt an individual category, to obtain the property and the state of each of the objects corresponding to the individual category to which an individual object belongs, for the individual object of which importance is equal to or greater than a predetermined second numerical value; and operation S3400 of generating object records including an identifier of the individual object and the detailed classification information as the object record attributed to the individual object through the identifier by inputting an individual object image that is the image of the individual object to the selected detailed classification model M430.

Here, the detailed classification model M430 is intended to distinguish one or more objects from each other, or in other words, each of the objects may be given an identifier that distinguishes each of the objects from each other, as the detailed classification information generated by the detailed classification model M430.

In addition, the object record refers to a record that includes information attributed to each object's identifier. As an example of the information attributed to each object's identifier, if the object is a person, the information attributed to each object's identifier may include the person's facial shape, height, gait, tattoos, hairstyle, and/or the like, and if the object is a dog, the information attributed to each object's identifier may include the dog's head shape, shape and/or color of the fur, and breed. The object record may include information about another object that belongs to each object, which may be an identifier of another object.

In particular, the fact that aspects of human gait can be classified by an artificial intelligence methodology has been disclosed in for example, the non-patent literature, Paper, Babaee, M., Li, L., & Rigoll, G. (2019). Person identification from partial gait cycle using fully convolutional neural networks. Neurocomputing, 338, 116-125.

Further, the fact that a person's hairstyle can be classified by an artificial intelligence methodology has been disclosed in for example, the non-patent literature, Paper, Muhammad, U. R., Svanera, M., Leonardi, R., & Benini, S. (2018). Hair detection, segmentation, and hairstyle classification in the wild. Image and Vision Computing, 71, 25-37. https://doi.org/10.1016/j.imavis.2018.02.001.

However, those skilled in the art will understand that information other than that illustrated in these prior documents may be obtained by the artificial intelligence methodology.

The operation S3200 of selecting the detailed classification model M430 for each of the individual objects may be performed by a classification model selection module 4320 implemented by the computing apparatus 100. The classification model selection module 4320 functions to select a detailed classification model appropriate for the category of an object after the category of the object has been obtained, along with an algorithm applied to the detailed classification model.

For example, when the category of the object is a person, the classification model selection module 4320 may select a detailed classification model that generates detailed classification information that can identify a person, such as the face shape, height, gait, tattoos, hairstyle, and/or the like of the person, and when the category of the object is a dog, the classification model selection module 4320 may select a detailed classification model that generates detailed classification information that can identify a dog, such as the head shape, the shape and/or color of the fur, the breed, and/or the like of the dog.

The fact that not only a face shape of a person but also a head shape of a dog can be classified by artificial intelligence methodology has been disclosed in for example, the non-patent literature, paper Mougeot, G., Li, D., & Jia, S. (2019). A Deep Learning Approach for Dog Face Verification and Recognition. In PRICAI 2019: Trends in Artificial Intelligence (pp. 418-430). Springer International Publishing. https://doi.org/10.1007/978-3-030-29894-4_34.

Further, for the artificial intelligence methodology for classifying dog breeds, the non-patent literature, paper Raduly, Z., Sulyok, C., Vadaszi, Z., & Zolde, A. (2018). Dog Breed Identification Using Deep Learning. In 2018 IEEE 16th International Symposium on Intelligent Informatics (SISY). Systems and IEEE. https://doi.org/10.1109/sisy.2018.8524715 may be referred.

Meanwhile, the detailed classification model M430 is a set of models, and may include a measurement model M431 that calculates at least one (one or more) of a position of the object, whether the object is in contact with a floor, a direction of the object, a speed of the object, a posture of the object, and/or a size of the object by performing at least one of two-dimensional measurement and/or three-dimensional measurement on the object. Here, the size of the object may include at least one (one or more) of a first dimension including at least one (one or more) of a height, a width, and/or a depth, a second dimension including a surface area of the object, and/or a third dimension including a volume of the object.

For example, the volume of the object may be calculated based on at least one (one or more) of an object segmentation of the object, a posture of the object, and/or depth information of the object.

When the object is a spatial object, the measurement model M431 may calculate at least one of a system position that is the origin of at least one of the bearings and the coordinates of the spatial object, a Manhattan space, which is a volume space including objects included in the space of the spatial object, a floor plane detected in the space, a vector of a gravitational force applied to the space, an empty volume space in the space excluding the objects included in the space in the space, a partial object of the spatial object, and/or a direction of the space. The space may be indoor or outdoor spaces.

Herein, a partial object of a spatial object refers to a partial object that configures the space of the spatial object, and the partial object is fixed in the space. Examples of the partial object of the spatial object may include glass windows, doors, walls, kitchens, roads, and/or overpasses.

A system position refers to a position of a system according to the present disclosure that serves as the origin of a bearing or a coordinate within an indoor or outdoor space.

Further, the direction of the space refers to a direction of the object that is the spatial object, which may be relative to a part of the system or the space of the present disclosure.

Depth information from the three-dimensional measurement may be predicted by an artificial intelligence methodology that derives depth information from the image, or may be supplementally provided by other sensors 340, such as lidar, radar, ultrasonic sensors, and/or the like for the image.

Specifically, in operation S3400, the three-dimensional measurement may further include: a process S3410 of identifying a length reference object, which is an object that satisfies the condition that a deviation in the length of at least part of the object is less than a predetermined criterion, among the objects or partial objects that form a part of the object or are components attributed to the object, and a process S3410 of measuring a two-dimensional length of the length reference object, and a process S3420 of detecting a floor plane of the object.

The purpose of the three-dimensional measurement is to determine the relative position between the system of the present disclosure and an object and/or the absolute position of an object by using information from one or more objects.

For example, the height of an adult male, an example of the length reference object, may be used as a reference length for objects belonging to other categories, such as doors, pencils, and/or cups, which may also be used to measure a distance.

Further, as another example of the length reference object, when multiple doors are detected in one full image or a space (or spatial object), doors of the same design in one space may be used as a length reference object for distance determination because the doors have similar heights.

Further, a partial object may also be used as a length reference object when the partial object is an object with relatively small deviations in length, and for example, the horizontal length of a human eyeball may be used as a length reference object because a standard deviation of the horizontal length of a human eyeball is relatively small.

In measuring the two-dimensional length of the length reference object in process S3410, when the posture information of the length reference object is available, a corrected length may be calculated by reflecting the inclination caused by the posture of the length reference object. The posture of the object and the computation of the posture of the object will be described later.

Floor Plane

Detection of the floor plane of the object in process S3420 may be accomplished in various methods, and for example, a method of detecting the floor plane that is in contact with the object in the vector direction of the gravitational force acting on the object.

Further, the detection of a floor plane of an object includes a method using Manhattan space detection, a method of generating a floor plane between the length reference objects and expanding the generated floor plane when there are two or more length reference objects, and a method of generating a floor plane between a length reference object before movement and the length movement object after the movement and expanding the floor plane when the length reference object moves.

FIGS. 6A to 6D are flow diagrams exemplifying methods that may be used to detect a floor plane of an object in the image processing method of the present disclosure.

Referring to FIG. 6A, a specific first exemplary embodiment of the detection of the floor plane of the object (S3420) starts with operation S3422*a* of detecting at least one size-similar object corresponding to a size-similar category, which is a category that satisfies the condition that the deviation in size of at least one portion of an object or a partial object of the object corresponding to a specific category among at least one category is less than a predetermined criterion. Herein, the size may be one or more of width, height, or depth.

For example, a category that satisfies the condition that the deviation in size is less than a predetermined criterion may be the category of desks. Certain types of desks have a relatively small deviation in height. If it is assumed that the average height of a desk of a specific type is 70 to 74 cm, the standard length for a size-similar object may be set to be 72 cm.

Optionally, the size-similar object may also be a floor reference object. A floor reference object is an object used for detection of the floor plane, and refers to an object of which at least a part of the object segmentation is generally in contact with the floor. For example, desks and chairs correspond to the floor reference object.

Following the operation S3422*a*, the first exemplary embodiment of the process S3420 includes operation S3424*a* of detecting a floor contact point, which is a contact point for the lowermost end of the object segmentation of the size-similar object.

FIG. 7A is a diagram exemplifying an object segmentation obtained by the image processing method in the present disclosure.

The method of obtaining object segmentation is known to those skilled in the art, and may be referred in, for example, the non-patent literature, paper Mo, K., Zhu, S., Chang, A. X., Yi, L., Tripathi, S., Guibas, L. J., & Su, H. (2019). PartNet: A Large-Scale Benchmark for Fine-Grained and Hierarchical Part-Level 3D Object Understanding. In 2019 IEEE/CVF Conference on Computer Vision and Pattern Recognition (CVPR). IEEE.

Referring to FIG. 7A, in the object segmentation of the exemplified chair, the lowermost ends of the regions 712, 714, 716, and 718 corresponding to the chair legs may be considered to be in contact with the floor, and a floor contact point 720 may be detected, which is a contact point with the lowermost end of the region. As another example, the lowermost end of the object segmentation of a door is in contact with the floor, and a floor contact point that is a contact point for the door may be detected.

Following the operation S3424*a*, the first exemplary embodiment of the process S3420 includes operation S3426*a* of determining a three-dimensional distance of the size-similar object based on a two-dimensional length of the size-similar object. For example, a chair located further away may have a smaller measurement of at least one (one or more) of the two dimensions length (height), width, and/or depth compared to a chair located closer, which may be used to determine the three-dimensional distance.

Following the operation S3426*a*, the first exemplary embodiment of the process S3420 further includes operation S3428*a* of connecting the floor contact points 720 to each other to generate a three-dimensional reference plane 730, and expanding the three-dimensional reference plane to generate a floor plane 740. Referring to FIG. 7A, a three-dimensional reference plane may be generated by connecting the lowermost ends of the chair legs together, and the three-dimensional reference plane may be further expanded to the floor plane 740.

Here, the expansion from the three-dimensional reference plane is performed the boundary of the corners of the gravity horizontal object, the start point of the wall, the lowermost end of the gravity horizontal object, and the like, resulting in the floor plane. Herein, the gravity horizontal object refers to objects that are typically disposed to be upright in parallel to the direction of gravity, and corresponds to, for example, glass windows and walls. Specifically, a gravity horizontal object may be an object (for example, a door and window) having lines and/or surfaces disposed horizontally to the gravity vector. A gravity horizontal object may be an object that has one or more lines and/or surfaces contacting the floor plane (for example, a door frame and a wall). A gravity horizontal object may also have a width to height ratio (a value obtained by dividing a horizontal length by a vertical length) of 1 or less.

On the other hand, a second exemplary embodiment of the detection S3420 of the floor plane by using the plurality of objects starts with operation S3422b of detecting a plurality of similar objects whose similarity to each other is equal to or greater than a predetermined value. For example, doors, desks, and chairs that have a consistent design may be the similar objects.

Considering that the image processing method of the present disclosure may be performed continuously and repeatedly, when the image processing method has already been applied to a space in which the similar objects exist, in the operation S3422b, the similar objects may be detected by using the position and length of the similar objects that were conventionally detected as a reference.

Following the operation S3422b, the second exemplary embodiment of the process S3420 further includes operation S3424b of detecting at least one lowermost object that is a lowermost object among the plurality of similar objects. As in the example in FIG. 7A, the legs of the chair, the lowermost end of the door are in contact with the floor, and the chair and the door are the lowermost objects.

Following operation S3424b, the second exemplary embodiment of the process S3420 further includes operation S3426b of detecting a floor contact point that is a contact point for the lowermost end of the object segmentation of each of the lowermost objects, and following the operation S3426b, the second exemplary embodiment of the process S3420 further includes operation S3428b of connecting the floor contact points together to generate a three-dimensional reference plane, and expanding the three-dimensional reference plane to generate a floor plane.

In a modified example of the second exemplary embodiment, the process S3420 may include operation S3422b' of detecting a plurality of similar objects whose similarity to each other is equal to or greater than a predetermined value, operation S3424b' of determining whether one object among the plurality of similar objects is located completely on top of another object among the plurality of similar objects, operation S3426b' of including the objects having different floor levels among the plurality of similar objects at different sets of floor levels based on whether the object is located completely on top, and operation S3428b' of, for each of the different sets of floor levels, connecting floor contact points that are contact points to the lowermost end of an object segmentation of an object of a floor level set object that is an object belonging to each of the sets of floor level to generate a three-dimensional reference plane, and expanding the three-dimensional reference plane to generate a floor level plane, thereby generating the floor level plane as two or more floor planes.

FIG. 7B is an exemplary diagram for illustrating operations for detecting two or more floor planes in the image processing method according to the exemplary embodiment of the present disclosure.

Since the operation S3422b' is the same as the operation S3422b, describing the "completely top" in the operation S3424b' and the operation S3426b' with reference to FIG. 7B, first, objects whose similarity is equal to or greater than a predetermined threshold value may be assumed to have the same height h within a margin of error.

When each object is located away from each other along the vertical axis (y-axis) in the full image, it may be detected that there is (i) a distance between the objects or (ii) a difference in the height of the floor level supporting the objects. When the lowermost left corner of the full image is the origin of the coordinate system, and there is a distance between the objects, an object 700b having a lower y-axis coordinate value than another object 700a is closer to the imaging device and needs to have a larger height ($h_b$), and a height ($h_a$) of the object 700a having a relatively higher Y-axis coordinate value needs to be smaller in a certain proportion compared to the height (hp).

That is, the objects (for example, 700b and 700a) that vary in height by a certain proportion based on the y-axis coordinate value and the objects (for example, 700b and 700d) that have a difference in the horizontal axis (x-axis) coordinate value but only differ by a certain level or less in the y-axis coordinate value may be determined to be on the same floor level, and a corresponding set of the floor level may be generated.

If the object 700c whose y-axis coordinate value is larger than that of another object 700a, but whose height (h.) does not decrease by a certain proportion from the height ha of the another object 700a, or whose height (h.) is equal to or larger than the height ha of the another object 700a, may be determined that the object 700c exists on a different floor level, and a different set of floor level may be generated.

By repeating the inference process, the sets of floor levels may be generated.

Alternatively, instead of the height of each object, the height or area of the three-dimensional reference plane that each object forms may also be used.

On the other hand, a third exemplary embodiment using the Manhattan space in the detection S3420 of the floor plane starts with operation S3422c of detecting at least one length-similar object corresponding to a length-similar category, which is a category that satisfies the condition that the deviation of the length of at least one portion of an object corresponding to a specific category among at least one category or a partial object of the object is less than a predetermined criterion.

Such a length-similar object may include a desk with a relatively small deviation in height.

Following the operation S3422c, a third exemplary embodiment of the process S3420 further includes operation S3424c of detecting a Manhattan space generated by the set of length-similar objects, operation S3426c of detecting a floor of the Manhattan space, and operation s3428c of extending the floor of the Manhattan space in a horizontal direction to generate a floor plane.

More specifically, the detection of the Manhattan space (S3424c) may include a first operation S3424c-1 of detecting a floor object, which is an object forming a floor among the objects, and generating a boundary of the floor object, a second operation S3424c-2 of detecting a wall object, which is an object perpendicular to the boundary of the floor object, and a third operation S3424c-3 of detecting a ceiling object, which is an object perpendicular to the wall object, as an object other than the floor object.

In other words, the Manhattan space here refers to the space enclosed by floor objects, wall objects, and ceiling objects. Examples of wall objects that are perpendicular to floor objects include glass windows and doors.

Unlike the preceding exemplary embodiments, a fourth exemplary embodiment using objects with the same pattern in the detection of the floor plane (S3420) starts with operation S3422d of detecting the same pattern objects, which is a plurality of objects with the same pattern.

Following the operation S3422d, the fourth exemplary embodiment of the process S3420 further includes operation S3424d of, when the same pattern objects are detected, detecting lower ends of the same pattern objects, and operation S3426d of measuring a relative distance between the same pattern objects based on one of an occlusion between the same pattern objects and a length difference in the image between the same pattern objects.

For example, in the operation S3426d, when one object occludes an object segmentation of another object, the one object may be detected as being closer to the system than the another object. Also, when one object is smaller than the others among the objects with the same pattern, that one object may be detected as being further away from the system than the others.

Following the operation S3426d, the fourth exemplary embodiment of the process S3420 further includes operation S3428d of generating a virtual plane from floor contact points of two or more objects, or from three or more points included in one object among the same pattern objects. If there are multiple virtual planes generated, those skilled in the art will readily understand that a floor-by-floor virtual plane may be generated, with each of the multiple virtual planes being a floor, based on differences in length, state, and position.

Following operation S3428d, the fourth exemplary embodiment of the process S3420 further includes operation S3429d of expanding the virtual plane to generate a floor plane.

Turning now to the three-dimensional measurement in the operation S3400, the three-dimensional measurement may further include process S3430 of setting a virtual length reference line on the detected floor plane after the floor plane is detected (S3420), and process S3440 of measuring a distance between a system position that is the origin of at least one of the bearings and coordinates of the spatial object and the object, or a position of the object relative to the system position.

On the other hand, the two-dimensional measurement in operation S3400 may include posture and direction measurement to calculate a two-dimensional posture and a two-dimensional direction of the object based on relative positions between partial objects of the object, width measurement to calculate a two-dimensional width of the object, and the like, which may be performed by the detailed classification module 4300 by using the measurement model M431 of the detailed classification model M430.

Due to the nature of two-dimensional measurement, width here refers to the width of the full image or object image without considering depth. The measurement of the two-dimensional width may be based on the classification and measurement of object segmentation.

Further, in order to generate properties of the object in operation S3400, the detailed classification model M430 may further include an intensive property model M432 for calculating at least one of the following: information of partial objects that form part of the object or are components attributed to the object, deep classification information of the object, a main color of the object, a species of the object, a subject of the object, one or more materials of the object, a transparency of the object, and/or whether the object is self-movable.

Here, the deep classification information of the object refers to the deep classification information of the category of the object, for example, if the category of the object is dog, the deep classification information may be the breed of the dog.

Posture and Action

Further, the detailed classification model M430 may further include a posture discrimination model M433 that calculates a posture of the object based on the processing results of the measurement model M431 and the intensive property model M432, and may further include an action discrimination model M434 that classifies an action of the object based on a temporally consecutive posture calculated from the posture discrimination model M433.

For example, the processor 120 of the computing apparatus 100 may obtain posture information about the object from analytical information corresponding to the object, using the posture discrimination model M433.

Further, the processor 120 of the computing apparatus 100 may obtain action information about the object from the posture information about the object by using the action discrimination model M434.

In this context, an action is a concept that encompasses both a decontextualized action and a contextualized action, but the action will be described later.

The posture discrimination model M433 may be a different category-specific posture discrimination model for each category, since the posture of an object may be determined differently depending on the category of the object. For example, a dog posture discrimination model that calculates a dog posture as a dog is seated may be different from a person posture discrimination model that calculates a person posture as a person is seated. Thus, based on the analysis information corresponding to the object, a posture determination method to be applied to the object among the plurality of posture determination methods may be determined in the posture discrimination model M433. The posture discrimination model M433 may apply different posture determination methods depending on the classification information indicating the category of the object.

Similarly, the action discrimination model M434 may be a different category-specific action discrimination model for each category, since the action discrimination method may be different depending on the category of the object. The action discrimination model M434 may apply different action discrimination methods depending on the classification information indicating the category of the object.

The posture discrimination model M433 may generate, from the analysis information, posture information about the object including information about the posture in N dimensions (for example, one-dimension, two-dimensions, and three-dimensions) corresponding to the object. Posture information for an object may include information about temporally consecutive postures for the object.

The action discrimination model M434 may obtain, from the posture information about the object, action information about the object including movement vector in N dimensions (for example, one-dimension, two-dimensions, and three-dimensions) corresponding to the object. Further, the action discrimination model M434 may generate, from the posture information about the object, action information about the object for context of the object, including action classification in N dimensions (for example, one-dimension, two-dimensions, and three-dimensions) corresponding to the object. The context of an object may include at least one of the state of the object and/or the purpose of the action. The action classification may be calculated by identifying the position of the partial object included in the object, determining the posture of the object based on the position of the partial object, and determining the action classification of the object based on the posture of the object. A partial object may include a portion of an object or at least one of the constituent elements attributed to the object.

Discrimination of the posture and the action may be done both in two dimensions and in three dimensions. Thus, the movement vector may include a two-dimensional movement vector including at least one of a two-dimensional direction and/or a two-dimensional speed of the object. Further, the movement vector may include a three-dimensional movement vector of the object that is calculated based on at least one of a position, a speed, and/or an acceleration of the imaging device that captured the image.

In the exemplary embodiment where the discrimination of the posture and the action is performed in two dimensions, in operation S3400, the detailed classification module 4300 may calculate two-dimensional motion information of the object including a two-dimensional movement vector of the object and a two-dimensional action classification of the object, from temporally consecutive object images, and the two-dimensional action classification may be calculated by identifying a position of each of the partial objects included in the object (S3450$a$), determining a two-dimensional posture of the object based on the relative position of each of the partial objects by using the posture discrimination model (M433) (S3460$a$), and determining a two-dimensional action classification of the object based on the temporally consecutive two-dimensional posture of the object by using the action discrimination model M434 (S3470$a$).

Here, the two-dimensional movement vector represents the two-dimensional direction and speed of the object, and the two-dimensional action classification represents the kind of action discriminated from the two-dimensional posture of the object.

On the other hand, in the exemplary embodiment where the posture and action discrimination is performed in three dimensions, in operation S3400, the detailed classification module 4300 may calculate three-dimensional motion information of the object including a three-dimensional movement vector of the object and a three-dimensional action classification of the object from the temporally consecutive object images, and the three-dimensional action classification may be calculated by performing operation S3450$b$ of identifying a position of each of the partial objects included in the object, operation S3460$b$ of determining a three-dimensional posture of the object based on a relative position of each of the partial objects by using the posture discrimination model M433, and operation S3470$b$ of determining a three-dimensional action classification of the object based on the three-dimensional posture of the temporally consecutive object using the action discrimination model M434.

Unlike the two-dimensional posture and action discrimination, in the three-dimensional posture and action discrimination, movement in the depth direction from the imaging device also needs to be reflected, so the computing apparatus 100 may use the interlocking sensor 340 to calculate or estimate at least one (one or more) of the position, speed, and/or acceleration of the imaging device, and reflect the calculated or estimated one (one or more) to calculate a three-dimensional movement vector of the object.

For example, when the system of the present disclosure drives the gimbal motor 330 to rotate an axis of the gimbal to track a bicycle, which is an object traveling in a rightward direction relative to the system, and calculates a three-dimensional movement vector of the bicycle, the three-dimensional movement vector may reflect both a movement vector caused by the motor 330 and a movement vector in the image.

For the calculation of the three-dimensional position and three-dimensional movement vector of the object, the standard focal length of the imaging device 200 and/or the standard focal length of the full image or the image of the object may be utilized. The relationship between the distance between the imaging device 200 and the object, the standard focal length, the three-dimensional height of the object (actual height), the height of the image (that is, the vertical size of the image), the height of the object in the image, and the height of the imaging device 200 is illustrated in the following Equation 1.

$$[\text{Equation 1}]$$

$$\text{Distance between imaging device and object (mm)} =$$

$$\frac{\text{standard focal length (mm)} \times 3D \text{ height of object (mm)} \times \text{vertical size of image (pixels)}}{\text{Height of object in image (pixels)} \times \text{height of imaging device (mm)}}$$

Equation 1 may be used to calculate the distance of the object from the imaging device 200, or the three-dimensional height of the object.

A distance reference line, which is one of the criteria used to measure the distance from the imaging device 200 to an object, may be a distance reference line established by using a concentric sphere relative to the system of the present disclosure, for example, when two or more objects of the same length are detected. This line is formed of a reference plane circle and a measurement plane circle, as described later. Each operation for setting the reference plane circle and a measurement plane circle is as follows.

FIG. 7C is a conceptual diagram for illustrating a method of generating and utilizing a reference plane circle and a measurement plane circle in the image processing method according to the exemplary embodiment of the disclosure.

Referring to FIG. 7C, a reference plane circle 750 is first generated in a plane direction that is perpendicular to gravity, and in this case, at least one (one or more) of an accelerometer, a gyroscope, and/or the gravity horizontal object may be utilized to determine that the object is perpendicular to gravity.

Here, the reference plane circle 750 corresponds to the cross-sectional shape of the surface of a concentric sphere 740, that is, the surface of the concentric sphere, which has the system, that is, the imaging device 200 as an original point, cut into the XY plane.

Next, length-equivalent objects, which are objects with the same length as each other among the length-similar objects, are detected.

When the set of points on the concentric sphere of FIG. 7C that are separated from the z-axis by an angle (0) is referred to as a measurement plane circle, the difference in the angle (0) coordinate values between the objects is measured by utilizing the fact that the objects of the same length are interposed between the measurement plane circles for each angle (0).

The distance of each object from the imaging device 200 may be measured by using the difference in the angle coordinate values, and in this case, a standard focal length, and optical characteristics of at least one (one or more) of the lens and/or aperture size of another imaging device may be auxiliary utilized.

On the other hand, the models listed in the present disclosure, including the action discrimination model M434, may be generated by supervised learning or reinforcement learning. It is understood that interpretation values (text or classification indexes) and video information corresponding to each of the acts of an object may be used as training data for supervised learning. In addition, reinforcement learning may be used by outputting the action information by the action discrimination model M434 to the user, and correcting the model by using positive or negative feedback when the user checks the output action information and gives positive or negative feedback.

Context

The detailed classification model M430 as a set may further include a context model M435 that infers context from the full image. Context describes the state of an object and the purpose of an act. For example, when an image of a person in a kitchen peeling an orange with a knife is input, the context model M435 may output the sentence "A person in a kitchen is peeling an orange with a knife" or an equivalent signal as context.

A behavior refers to the action of an object without context, and for example, a person running on a basketball court and a person running on a treadmill both exhibit the behavior of "running". These behaviors may be synthesized with the context described later to determine a contextualized action. According to this, the former is equivalent to the action "playing basketball" and the latter is equivalent to the action "running on a treadmill".

Specifically, the context may be an object context including at least one of an action and a state of each of the individual objects appearing in the full image, and a context interaction object, which is another object detected to interact with the individual object by the action.

Further, the context may be a spatial context including a place that is a kind of the spatial object inferred from each of the spatial object and individual objects other than the spatial object that appear in the full image, at least one of an act and a state of each of the individual objects, an actor that is an individual object corresponding to a subject of the action, and a context interaction object that is an object detected to interact with the individual object by the action.

In one exemplary embodiment, the synthesis of behavior and context to determine contextualized action may be implemented as supervised learning using an artificial neural network model. For example, an artificial neural network model may be trained by using training data in which one scene of consecutive images, that is, a video, is set as input data and linguistic interpretations (that is, data represented in language) that include the behavioral and spatial context of an object are labeled as output data that is a correct answer.

This has been disclosed in the non-patent literature, paper Wu, Z., Yao, T., Fu, Y., & Jiang, Y.-G. (2017). Deep learning for video classification and captioning. In Frontiers of Multimedia Research (pp. 3-29). ACM.

Meanwhile, for a more specific method to determine the action of the object for each object, Wu, C.-Y., Girshick, R., He, K., Feichtenhofer, C., & Krahenbuhl, P. (2020). A Multigrid Method for Efficiently Training Video Models. In 2020 IEEE/CVF Conference on Computer Vision and Pattern Recognition (CVPR). IEEE. https://doi.org/10.1109/cvor42600.2020.00023 may be referred.

On the other hand, there may be cases where the behavior is alien to the spatial context, in which case there is room for the action to be interpreted out of context. For example, an object that is a person running in a cafe may be interpreted as action of "moving quickly" rather than action of "running". This discrepancy is either because the action is not fully reflective of the context or the context is not fully reflective of the action. That is, the action may be inferred from contexts, and contexts may also be inferred from the action, so that a recursive process of inferring context from an action and inferring the action from context again is required, and this may be achieved by, for example, the neural network model, such as a Recursive Neural Network (RNN) or bidirectional LSTM disclosed in the non-patent literature, paper Ullah, A., Ahmad, J., Muhammad, K., Sajjad, M., & Baik, S. W. (2018). Action Recognition in Video Sequences using Deep Bi-Directional LSTM With CNN Features. IEEE Access, 6, 1155-1166. https://doi.org/10.1109/access.2017.2778011.

Priority

Now, the priority of objects, which is closely related to the importance of the aforementioned objects will be described. Here, importance is a value that is manipulated to give priority, and typically, the priority may be set by calculating the importance of each object and then ranking the object in order of importance.

The priority of the objects may include an authority-based priority assigned to each of the objects based on the authority of the objects. The priority is set based on the authority of each classified object, and for example, when an object that is a particular user has the highest authority on the system of the present disclosure, a high priority may be given to the particular user.

The authority-based priority may be calculated by performing an operation of determining, based on properties of the object analyzed using the detailed classification model M430, whether the object is a predetermined authorized person to handle the computing apparatus; and an operation of, when the object is the predetermined authorized person, setting a predetermined ranking for the authorized person as the authority-based priority for the object.

For example, since the authorized person is expected to be a human, the object that is human may be first detected, and the authority-based priority may be set only for the detected object that is human.

Furthermore, the computing apparatus of the present disclosure may specify an individual among a plurality of people by using the aforementioned deep classification information, and may use properties of an object, such as a color of the object, or properties of a partial object, or an object record of the object, to specify the individual.

On the other hand, the priority of the objects may have a classification-based priority assigned to each of a set of objects distinguished according to at least one of the properties of the objects including a category of the objects or deep classification information of the objects.

Classification-based priority may be a preset priority given to categories, such as people, animals, and other objects, or deep classification information, which may be manually set by an authorized person of the system. As another example, the computing apparatus of the present disclosure may automatically set a variable priority by category or deep classification information based on patterns of use of the system of the present disclosure by an authorized person of the system.

Next, the priority of the object may include a size-based priority assigned to each of a set of objects distinguished by at least one of the properties of the objects including the size of the objects.

The size-based priority may be calculated by the detailed classification module 4300 performing an operation of obtaining an object segmentation of the object, selecting an object of which the proportion of a size of the object segmentation occupied in the full image is equal to or greater than a predetermined proportion, among the objects, and/or setting the size-based priority based on the size of the object segmentation of the selected object. This is because the larger the object, or the closer the distance between the object and the system of the present disclosure, the larger the proportion of the object segmentation of the object occupied in the full image, and therefore the higher the proportion, the more important it is, and the higher the priority is set.

Further, the priority of an object may include an action-based priority assigned to each of a set of objects distinguished by at least one of the states of the object including an action of the object.

Specifically, the detailed classification module 4300 may search for an object that perform a certain action and assign a priority corresponding to the action.

For example, when the action of a person falling down is searched, the highest priority may be set for the fallen person. As another example, when there is an object that is a person giving commands with a specific gesture, such as a swipe in the air, a higher priority may be assigned to the object that is the commanding person.

As a final example, the priority of an object may include a context-based priority assigned to each of a set of objects distinguished by at least one of the states of the object including the context of the object.

According to the context-based priority, the detailed classification module 4300 may infer object context and spatial context from the full image by performing a state analysis or a spatial analysis on the full image, and set a relatively high priority for the actor or the context interaction object based on whether the object is the context interaction object that is the object detected to interact with the actor by the actor or the action of the actor by at least one of the inferred object context and/or spatial context.

For example, if the spatial context is "people of child age are playing baseball on a playground", a person detected holding a baseball bat may be given a relatively high priority.

The operations and processes described in the present disclosure are not intended to be performed in the order described unless logically contradictory or the context otherwise indicates, and those skilled in the art will understand that each of the operations and processes may be performed simultaneously or at different times.

Further, while the above operations may be performed once, preferably the above operations may be performed in real-time and/or iteratively to obtain temporally continuous images as described above.

In other words, the image processing method of the present disclosure may further include operation S4000 of returning to the image acquisition operation S1000 to obtain a new full image, and in this case, the image acquisition operation S1000 may be performed again by controlling the available resources by the tracking controller 4400.

Here, the tracking controller 4400 is a module, similar to the image input module 4100, the object analysis module 4200, and the detailed classification module 4300, and functions to enable the system of the present disclosure to implement tracking, that is, the movement, of the imaging device to orient the imaging device 200 toward a target object or target space, and herein, the available resources refer to hardware and/or software that enable such tracking.

In one exemplary embodiment, the tracking controller 4400 may include a target position determining module 4420 that determines a target position and magnification corresponding to the composition to be captured by the imaging device 200, and a tracking resource controller 4440 that controls the available resources, that is, hardware and software resources, to obtain the full image of the target position.

Target Position Determining Module

FIGS. 8A to 8C are flow diagrams illustrating methods that may be used to determine a target position in the image processing method of the present disclosure.

In the exemplary embodiment exemplified by FIG. 8A, the target position determining module 4420 may perform operation S4110*a* of obtaining an object priority of at least one candidate object appearing in the full image, operation S4120*a* of obtaining an object segmentation of the candidate object, operation S4130*a* of identifying a context interaction object, which is an object detected as interacting with the candidate object according to the context inferred from the full image, operation S4140*a* of determining the composition to be captured by the imaging device 200 to include at least one target object, which is a candidate object having a predetermined rank or an object priority higher than the predetermined rank, and the context interaction object of the target object; and an additional composition prediction operation S4150*a* to determine the target position and magnification by expanding the composition according to the direction of the target object.

Identification of context interaction objects may be accomplished by a context model M435. The fact that the context model M435 may be generated by supervised learning is disclosed in the non-patent literature, paper, Shin, D., & Kim, I. (2018). Deep Image Understanding Using Multilayered Contexts. Mathematical Problems in Engineering, 2018, 1-11.

More specifically, the additional composition prediction operation S4150*a* may include operation S4152*a* of obtaining a direction of the target object and operation S4154*a* of obtaining a speed of the target object. As described above, the direction of the target object may be obtained based on the relative positions of the partial objects included in the target object, and the speed of the target object, that is, the three-dimensional motion vector, may be calculated based on the two-dimensional motion vector obtained from the image and information from the sensor 340.

The additional composition prediction operation S4150*a* may then further include operation S4156*a* of calculating an influence range of the target object, which is a range within which interaction with the target object is possible, based on the direction and speed of the target object, and operation S4158*a* of determining the target position and magnification by expanding the composition to reflect the influence range.

Herein, the influence range is the range of space in which the target object is likely to occupy, at least temporarily, over a predetermined time span starting from the present, or is likely to be occupied by the context interaction object with which the target object is likely to interact, that is, a range of space in which physical contact of the target object is possible, for example, the range to which a part of a person's body can be physically contacted or the range to which a context interacting object may be present, from which the target object may receive or transmit signals through such as an eye, ear, mouth, or the like, for example, a Field Of View (FOV) within which signals can be received and transmitted by the target object.

In one example, in operation S4156a, the eye has an influence range of 20 meters, and the hand may have an influence range of 1 meter. The influence range may be combined with action information (action classification) of each object and used to adjust the composition. For example, if the target object is "a child standing in a baseball batting cage holding a bat", in operation S4158a, the composition may be adjusted to include the direction of the child's gaze and/or the object of the bat in the child's hand.

In the meantime, in another exemplary embodiment exemplified by FIG. 8B, the target position determining module 4420 may determine the composition to be photographed based on the priority of the object, and specifically, the target position determining module 4420 may perform obtaining an object priority of at least one candidate object appearing in the full image (S4120b), determining at least one target object that is a candidate object having an object priority of a predetermined rank or a rank higher that the predetermined rank (S4140b), and determining the composition to be photographed by the imaging device 200 to include the target object (S4160b).

Referring to FIG. 8C, in another exemplary embodiment that reflects the priority of the object, the target position determining module 4420 may perform obtaining an object priority of at least one candidate object appearing in the full image (S4120c), generating a virtual segmentation comprising the candidate object based on the object priority of the candidate object, in which the virtual segmentation is generated such that the higher the object priority, the larger the area of the virtual segmentation (S4140c), calculating an attraction between the virtual segmentation that monotonically increases with the area of the virtual segmentation according to a predetermined increasing function, a first attraction between the candidate objects that monotonically decreases with the distance between the candidate objects according to a predetermined first decreasing function, and a second attraction between the candidate object and a frame boundary line of the full image according to a predetermined second decreasing function, and determining an equilibrium state of the attraction, the first attraction, and the second attraction (S4160c), and determining a target position and magnification corresponding to the composition by calculating a target center, which is a central point of the at least one candidate object in the equilibrium state (S4180c).

Tracking Resource Controller

The tracking resource controller 4440 may include an image switching controller 4442 that controls the acquisition of a new image from an image obtained from the imaging device 200 without control of the gimbal 300 and the posture of the imaging device 200; and a frame switching controller 4444 that controls the acquisition of the new image by the imaging device 200 through the control for the gimbal 300 and the imaging device 200 when the computing apparatus 100 is interlocked with the gimbal 300 which is mounted with the imaging device 200 and has one or more axis of rotation that control the posture of the imaging device 200.

The frame switching controller 4444 and the image switching controller 4442 may operate to complement each other, such that the tracking resource controller 4440 may make a control to first obtain a new image of the desired resolution from the frame switching controller 4444 and, if it fails to obtain a new image, to obtain a new image through image reconstruction by the image switching controller 4442.

In a specific exemplary embodiment, the image switching controller 4442 may perform determining whether idle resources capable of performing image reconstruction exist (S4310), when the idle resource exists, loading the previously obtained full image or a portion of the full image into a memory as an original image (S4320); and obtaining the new image according to the target position and magnification by cropping the original image according to the target position and magnification or when the resolution of the original image falls below a predetermined threshold value, performing super-resolution (S4330).

It is known to those of ordinary skill in the art that super-resolution may be performed by using neural networks, such as autoencoders.

In the meantime, the frame switching controller 4444 includes a gimbal controller 4444a that controls the direction of the imaging device 200 by actuating the one or more rotational axis of the gimbal 300 to achieve the target position (that is, to reach the target position), a zoom controller 4444b that controls zooming in and zooming out of the imaging device (200) to achieve the magnification; and a front and rear imaging device controller 4444c that controls the imaging device 200 to capture the environment while reducing the operation of the hardware among the available resources, and includes the gimbal controller 4444a among the controllers.

The imaging device 200 may also include two or more imaging devices, and may be, for example, imaging devices 200 mounted on the front and rear of the portable terminal 100, respectively. The front and rear imaging device controller 4444c may scan the entire space surrounding the system, that is, the surrounding space, by using the front imaging device 200a (not illustrated) and the rear imaging device 200b (not illustrated), and the front imaging device or the rear imaging device in the imaging device 200 may be selected based on user's convenience.

For example, the front and rear imaging device controller 4444c may select the front imaging device 200a as the imaging device to be used to obtain an image of the user when the user is looking at the display of the portable terminal 100.

As another example, the front and rear imaging device controller 4444c may make a control to recognize an object through the front imaging device 200a, and then to recognize the object with the rear imaging device 200b with a higher resolution when the image of a higher resolution than the resolution of the front imaging device 200a is required for the object.

Additionally, the front and rear imaging device controller 4444c may obtain images of the surrounding space while minimizing rotation of the axis of the gimbal 300 by using the front imaging device 200a and the rear imaging device 200b simultaneously or sequentially.

Meanwhile, the frame switching controller 4444 may control the orientation of the imaging device 200 to one of a vertical direction (portrait) and a horizontal direction (landscape) based on a horizontal to vertical ratio (a value obtained by dividing a horizontal length by a vertical length) of the specific object or the partial object included in the specific partial object so that the composition includes all of at least one specific object or the specific partial object. For example, this may be accomplished by rotation of the roll axis R of the gimbal 300. In the horizontal to vertical ratio, horizontal may mean perpendicular to the gravity vector. In the horizontal to vertical ratio, vertical may mean horizontal to the gravity vector. Thus, the horizontal to vertical ratio may be a horizontal to vertical ratio that counts a portion of one reference plane as a horizontal length. The reference plane may be a plane perpendicular to the gravity vector and/or a plane in contact with the floor. However, the corresponding reference plane is not limited to this, and various planes may be set as the reference plane. The horizontal to vertical ratio may not change in tendency (for example, equal to or greater than 1 or equal to or less than 1) depending on the direction of the object.

Specifically, the frame switching controller 4444 may control the orientation of the imaging device in one of a vertical direction and a horizontal direction such that the object segmentation of the at least one specific object or the specific partial object or an object box comprising the at least one specific object or the specific partial object does not contact a frame boundary line of the full image.

Figure 9A:
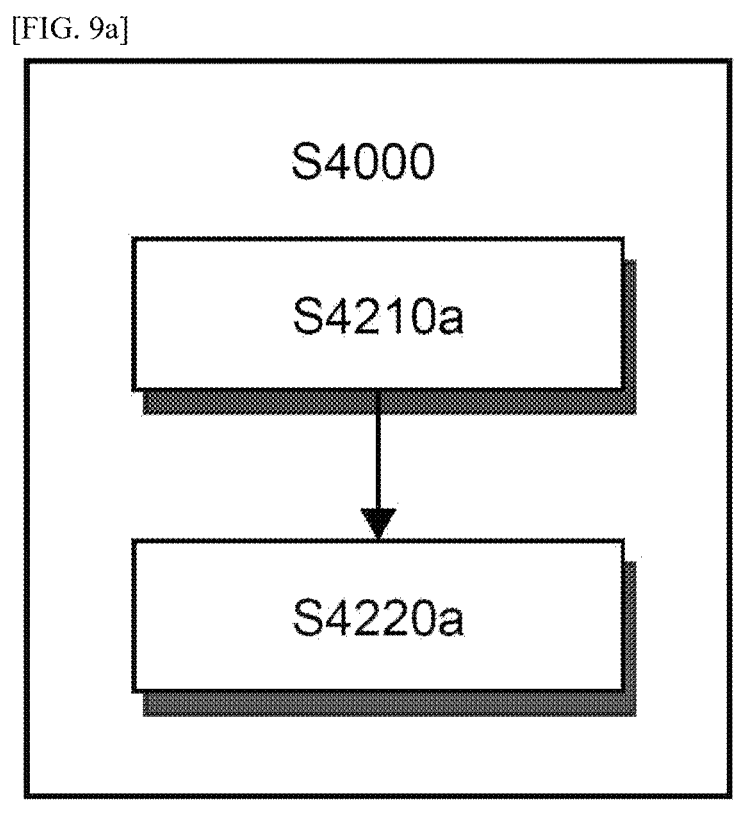

FIGS. 9A and 9B are flow diagrams for exemplifying methods that may be used to control the orientation of an imaging device in the image processing method of the present disclosure.

Describing one exemplary embodiment of the frame switching controller 4444 for orienting the imaging device in more detail with reference to FIG. 9A, the frame switching controller 4444 may perform, when an object segmentation or an object box of the at least one specific object or the specific partial object first contacts a frame boundary line of the full image, releasing the first contact by controlling the gimbal to move in the opposite direction of the first contacted position, to the extent that a center point of the object segmentation or the object box is present within the composition (S4210a), and when the object segmentation or the object box second-contacts the frame boundary line at the opposite side of the first contact position after the movement, releasing the second contact through at least one of (i) an operation to switch the orientation of the imaging device from one of the vertical direction (portrait) and/or the horizontal direction (landscape) to the other, and (ii) an operation to control a zoom-in and a zoom-out of the imaging device (S4220a).

Describing another exemplary embodiment of the frame switching controller 4444 in detail with reference to FIG. 9B, the frame switching controller 4444 may perform obtaining a ratio characteristic of the property of the at least one specific object or the specific partial object (S4210b), in which the ratio characteristic includes a category-specific ratio characteristic, which is predetermined for each category or the ratio of the length to the width (a value obtained by dividing a horizontal length by a vertical length) of the specific object or the specific partial object calculated for each category by the measurement of the specific object or the specific partial object, and a detailed classification-specific ratio characteristic which is predetermined for each detailed classification of the specific object or the specific partial object or the ratio of the length to the width (a value obtained by dividing a horizontal length by a vertical length) calculated for each detailed classification by the measurement of the specific object or the specific partial object, and the ratio of the length to the width (a value obtained by dividing a horizontal length by a vertical length) of the composition determined by the target position determining module, and based on the ratio characteristic, determining whether to perform a roll rotation, which is an operation to switch the orientation of the imaging device from one of the vertical direction (portrait) and the horizontal direction (landscape) to the other, and adjusting the orientation of the imaging device based on whether the performance has been performed (S4220b).

For example, the horizontal to vertical ratio (the value obtained by dividing the horizontal length by the vertical length) of a television is greater than 1, so the orientation of the imaging device 200 may be adjusted in a horizontal direction, and the horizontal to vertical ratio (the value obtained by dividing the horizontal length by the vertical length) of a standing person is less than or equal to 1, so the orientation of the imaging device 200 may be adjusted in a vertical direction.

Following operation S4220b, the frame switching controller 4444 of the present exemplary embodiment may further perform, when the object segmentation or the object box of the at least one specific object or the specific partial object contacts the frame boundary line of the full image, releases the contact through at least one of (i) the operation to switch the orientation of the imaging device from one of the vertical direction (portrait) and the horizontal direction (landscape) to the other, and (ii) the operation to control a zoom-in and a zoom-out of the imaging device and making the at least one specific object or the specific object be included in the composition (S4230b). Here, when the object segmentation or object box does not contact the frame boundary line, the operation S4220b is terminated and operation S4230b is not performed.

Optical Characteristic Recognition (OCR)

Now, the OCR will be described by returning to the description of the detailed classification model M430. The classification model M430 may further include an OCR model M436 for extracting text appearing on the surface of the object. Thus, the processor 120 of the computing apparatus 100 may obtain the characters contained in the object from the analysis information corresponding to the object by using the OCR model M436.

Correspondingly, the operation S3400 described above may include operation S3500 in which the detailed classification module 4300 performs OCR by using the OCR model M436 of the detailed classification model M430 to calculate the text of the object as part of the properties of the object.

Specifically describing operation S3500, the OCR model M436 may include operation S3520 of first determining whether a character is displayed on the surface of the object.

In the operation S3520, it is known that it is possible to determine the object on which the characters are displayed by detecting characters by using deep learning or conventional OCR techniques.

Next to the operation S3520, the OCR model M436 may perform an OCR performance operation S3540 of performing OCR on the displayed characters (for example, entire characters and/or a character set) when the characters are displayed on the surface of the object, and inputting (storing) the resulting text that is the result of the OCR as a property of the object.

According to one exemplary embodiment of the present disclosure, the OCR model M436 may perform determining whether a character is displayed on the surface of the object and, performing OCR on the entire characters including the character when it is determined that the character is displayed on the surface of the object.

According to one exemplary embodiment of the present disclosure, the OCR model M436 may perform determining whether a character is displayed on the surface of the object and, performing OCR for each character set when it is determined that the character is displayed on the surface of the object.

Method of Distinguishing Character Sets

At least one of the processor 120 and the OCR model M436 may distinguish a character set to which the character belongs based on at least one of the type, shape, size, or placement of the character. In addition, the processor 120 may distinguish a character set that are highly likely to be closely related in the interpretation of one context.

The method of distinguishing the character set to which a character belongs, the character set belonging to the context is as follows. For example, at least one of the processor 120 and/or the OCR model M436 may distinguish the character set based on character set characteristics.

The character set characteristic may include one or more of the following characteristics: language type of the character, line spacing, space between characters, aspect ratio (for example, a horizontal to vertical ratio), size, thickness, color, font, style, character associated with the beginning or end of a sentence, blank (for example, space from the boundary of at least one of the following sentence, an object, or a partial object), or the position of the character in the object. Therefore, at least one of the processor 120 and/or the OCR model M436 may distinguish the character set by using one or more of the following characteristics: language type of the character, line spacing, space between characters, aspect ratio (for example, a horizontal to vertical ratio), size, thickness, color, font, style, character associated with the beginning or end of a sentence, blank (for example, space from the boundary of at least one of the following sentence, an object, or a partial object), or the position of the character in the object.

For example, at least one of the processor 120 and/or the OCR model M436 may distinguish a completed sentence or context based on the type of language the characters belong to. At least one of the processor 120 and/or the OCR model M436 may distinguish a completed sentence or context based on the type of language to which each character belongs when the recognized characters are multilingual, such as on the surface of a product manual.

In another example, at least one of the processor 120 or the OCR model M436 may distinguish paragraphs based on at least one of line spacing, space between characters, aspect ratio, and/or color when the sentences are of the same size and font.

In another example, at least one of processor 120 and/or OCR model M436 may distinguish the character set based on a top end or a start position of a paragraph. The nature or a title of a paragraph may also be displayed in bold style or a different size at a top end or start position of the paragraph.

Objectize Character Set

The processor 120 and/or the OCR model M436 may distinguish the character set based on the "method of distinguishing character set" described above. The processor 120 and/or the OCR model M436 may recognize a character set object based on the character set. A character set object may be a character set which is set to a single target. A character set object may include at least one of the following: a character image, text information, or character set characteristics. For example, a character set object may include images of characters prior to OCR or natural language understanding (processing). For another example, a character set object may include text information after OCR or natural language understanding (processing). Herein, a character set object may be split into multiple character set objects after OCR or natural language understanding (processing).

The processor 120 and/or the OCR model M436 may distinguish one or more character sets displayed on the surface of the object or the partial object. The processor 120 and/or the OCR model M436 may also perform contextual interpretation based on at least one of the property or the state information of the object or the partial object displayed by the character set. The property and/or state of the object and/or the partial object may be included in character set characteristics.

The processor 120 and/or the OCR model M436 may use the type and/or position of the object or partial object represented by the character set as additional information for natural language understanding (processing) and/or contextual interpretation.

For example, when the characters displayed on the shirt (object or partial object) and the characters displayed on the car (object or partial object) are the same, the processor 120 and/or the OCR model M436 may use characters (for example, a brand name) displayed on one of a shirt or a car as additional information. Here, the processor 120 and/or the OCR model M436 may determine that the characters displayed on the car reflects (is relatively more likely to reflect) the property of the object and/or a characteristic of the overall context, and may use the characters displayed on the car as additional information.

When the plurality of characters is present in the object, the processor 120 and/or the OCR model M436 may obtain the property of the object based on the position where the plurality of characters is displayed. The plurality of characters can have different meanings depending on their position. For example, when characters displayed on the front of a shirt (object or partial object) and characters displayed on a label of the shirt (for example, a care label) are simultaneously present, the processor 120 and/or the OCR model M436 may determine that the characters displayed on the label of the shirt reflect (is relatively more likely to reflect) the properties of the object, and use the characters displayed on the label of the shirt as additional information.

The processor 120 and/or the OCR model M436 may perform OCR and/or natural language understanding (processing) of the objectified character set for each character set object. The processor 120 and/or OCR model M436 may perform OCR and/or natural language understanding (processing) on one or more character set objects based on the character set characteristic. Here, the processor 120 and/or OCR model M436 may sequentially or simultaneously perform OCR and/or natural language understanding (processing) on one or more character set objects based on the character set characteristic.

The unit of OCR and/or natural language understanding (processing) is not limited to the entire characters on the surface of the object or partial object, but may have characters or a character set classified based the character set characteristic as a minimum unit.

On the other hand, the operation S3540 of performing OCR may be performed in a variety of methods.

For example, the operation S3540 of performing OCR on the character (for example, the entire characters and/or the character set), performed by the processor 120 of the computing apparatus 100, may include extracting at least one image sample from the object on which the character is displayed, determining, from the at least one image sample, a boundary line of an area in which the character is displayed, generating a character-displayed image (for example, a full character-displayed image and/or a character set-displayed image) based on at least one of boundary lines or boundary points which are points belonging to the boundary line in the at least one image sample, and performing OCR on the character-display image.

The image sample may be an image pattern present at a position of at least one of boundary lines and/or boundary points. The image pattern may include at least one of the following: a partial character, a border of the character, a portion of the character, and/or a background. A background may be an image pattern that does not constitute a character.

The operation of generating the character-displayed image based on at least one of the boundary line or the boundary point that is the point belonging to the boundary line in the at least one image sample, and the operation of performing OCR on the character-displayed image may include obtaining, from the at least one image sample, image patterns located at least one of the boundary line or the boundary point as a boundary marker, and generating a character-displayed image, which is the image including the boundary marker, as a partial image included in the image of the object on which the characters are displayed. The boundary marker may include at least one of start markers and/or end markers. The start marker may be an image pattern that corresponds to the start character of the characters. The end marker may be an image pattern that corresponds to the end character of the characters.

The operation of obtaining the image patterns present at a position of at least one of boundary lines or boundary points in the at least one image sample as the boundary marker may include obtaining, by using the tracking controller 4400, a character image including a start marker and having a character recognition rate of at least a threshold value, and determining whether the character image incudes an end marker.

Then, when the character image includes the end marker, the processor 120 may determine the character image as a character-displayed image.

When the character image does not include the end marker, the processor 120 may obtain an additional character image that includes the next marker after the last marker among the boundary marker included in the character image and that have a character recognition rate of at least to or greater than a threshold value by using the tracking controller 4400. The processor 120 may merge the additional character image into the character image to generate a merged character image. When the merged character image includes an end marker, the processor 120 may then determine the merged character image as a character-displayed image.

In the meantime, in another example, the operation S3540 of performing OCR on the character performed by the processor 120 of the computing apparatus 100 may include obtaining, by using the tracking controller, an image of an object including a start point of the character and having a character recognition rate of at least a threshold value, performing OCR on the initial sentence area of the image of the object, and performing Natural Language Understanding (NLU) on a first text, which is a primary result of the OCR, to calculate a first value of meaningfulness, which is a numerical value of the meaningfulness.

When the first value of meaningfulness is equal to or greater than a threshold value, the processor 120 may determine the first text to be the result text that is the result of the OCR. When the first value of meaningfulness is less than the threshold value, the processor 120 may perform OCR on the next sentence area of the initial sentence area. The processor 120 may perform natural language understanding of a second text, which is the primary result of OCR, to calculate a second value of meaningfulness, which is a numerical value of the meaningfulness. Then, when the second value of meaningfulness is equal to or greater than the threshold value, the processor 120 may determine the second text to be the result text that is the result of the OCR.

The initial sentence area may be the area occupied by the sentence that is detected to be first disposed in the disposition method of the characters based on the language used in the sentence.

The computing apparatus 100 may be interlocked with the imaging device 200 and the gimbal 300. For example, the computing apparatus 100 may include an imaging device 200 and may be interlocked with the gimbal 300 that controls the posture of the imaging device 200.

The processor 120 of the computing apparatus 100 can control the direction of the imaging device 200 by actuating one or more axis of rotation of the gimbal 300 by using the tracking controller 4400.

The processor 120 may obtain the image by zooming in and/or zooming out of the imaging device 200 by using the tracking controller 4400.

Figure 10A:
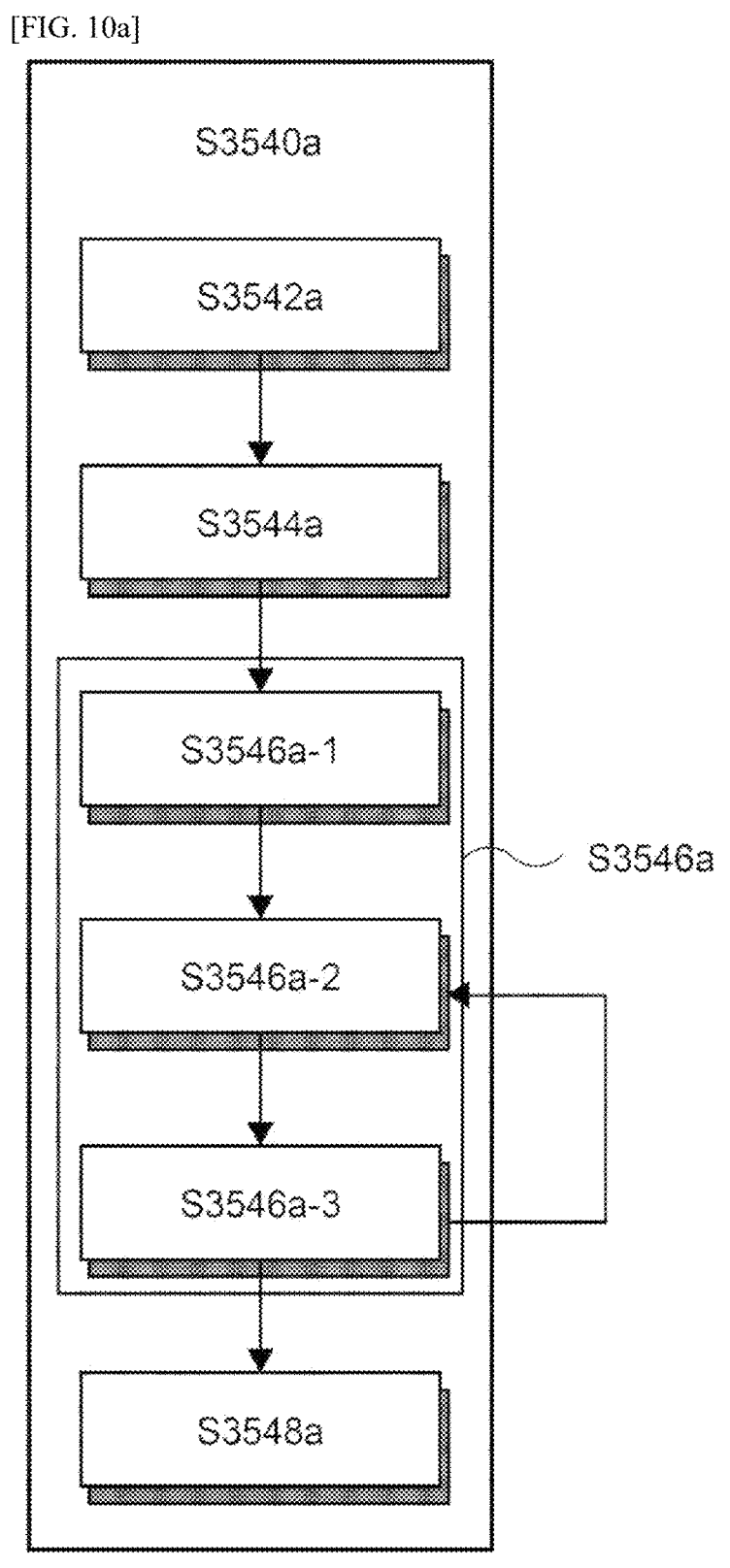

FIGS. 10A to 10C are flow diagrams for exemplifying methods that may be used to perform OCR in the image processing method of the present disclosure, and FIGS. 11A to 11D are illustrative drawings for illustrating methods of performing OCR in the image processing method of the present disclosure.

Figure 11A:
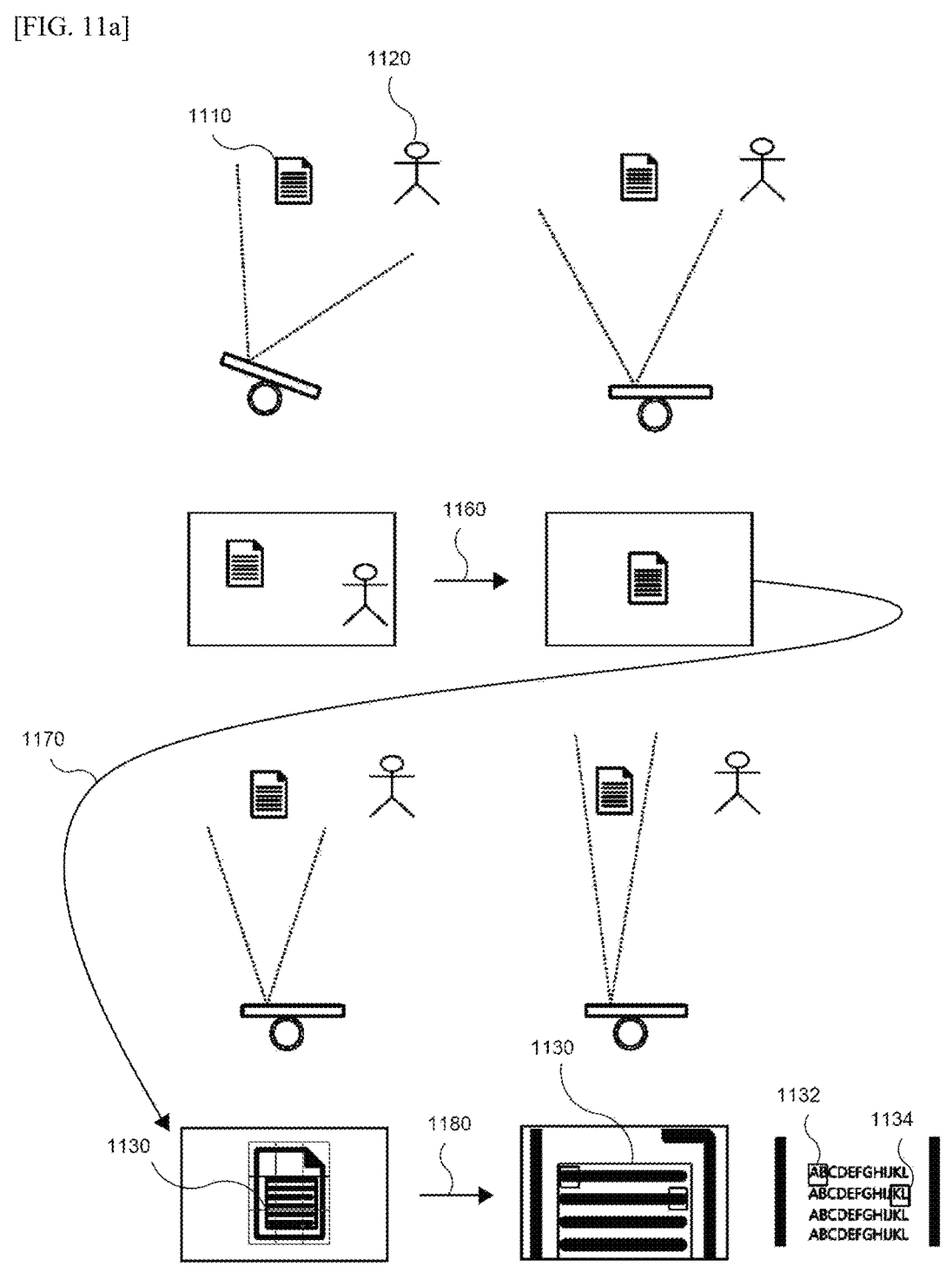

First, referring to FIGS. 10A and 11A, the operation S3540a of performing OCR in the exemplary embodiment utilizing the boundary marker includes operation S3542a of extracting image samples from the character-displayed object (for example, the paper document of reference numeral 1110), operation S3544a of demarcating a boundary line of a character-displayed area (for example, the closed curve of reference numeral 1130) from the image samples, subsequent to the operation S3542a.

Here, the image sample is an image pattern present at the position of a boundary line or boundary point, in which the image pattern may include a partial characters, a border of the characters, a portion of the characters, or backgrounds. The boundary line refers to the boundary line of a cluster of characters displayed on the surface of an object, and the boundary point refers to a set of points that may constitute a boundary line. In this context, a background refers to an image pattern that does not constitute a character by itself.

The operation S3540a of performing OCR in this exemplary embodiment further includes, after the operation S3544a, a boundary marker acquisition operation S3546a, in which image patterns located on the boundary line or the boundary point that is the point belonging to the boundary line are obtained as boundary marker among the image samples, and in this operation, an image pattern corresponding to the start character of the entire characters among the boundary marker may be referred to as a start marker, and an image pattern corresponding to an end character of the entire characters among the boundary marker may be referred to as an end marker.

The boundary marker functions as a marker for determining the coordinate region of space occupied by each character belonging to the entire characters in the object image.

A boundary marker is one of the image patterns located in the boundary line or a boundary point that is the point belonging to the boundary line, and the border of the character may be used. A border of a character refers to, in a specific sentence, a portion of the image that forms part of the character extending in the horizontal or vertical side of the sentence. For example, in the sentence "가나다라마바시", the " ㅣ " in 가 and the ' ] ' in 시 are parts of the characters and may be called boundary marker, which are the borders of the characters.

Additionally, a partial (or full) character may be used as one of the boundary marker. For example, in the sentence "ABCDEFG", A and G may be used as boundary marker, which are parts of the characters located at the boundary point and/or the boundary line.

The acquisition of the start or the end marker reflects an arrangement method of the characters according to the language of the sentence formed by the entire characters. For example, in the OCR for books in Korean and English, an image sample 1132 in the upper left end of the area displayed with the characters may be a start marker, and the image sample 1134 in the lower right end of the area may be an end marker, as illustrated in FIG. 11.

The boundary marker acquisition operation S3546a may include, more specifically, controlling available resources by the tracking controller 4400 to obtain a character image that is an image including the start marker and has a character recognition rate of at least a predetermined threshold value (S3546a-1).

Herein, the character recognition rate refers to the rate at which a particular character is recognized as a specific text in a character image. For example, it may be possible to estimate the presence of a character from a distant image in which the character-displayed object appears by using deep learning and the like, but it may be difficult to determine which character it is due to the small size or low resolution of the distant image, resulting in a low character recognition rate by OCR.

In other words, a character image with a character recognition rate of at least than a predetermined threshold value refers to an image having an OCR-capable resolution. In order to obtain an enlarged character image of sufficiently high resolution to perform the operation S3546a-1, the system of the present disclosure may control zooming in, zooming out, and rotation of the imaging device 200 through the tracking controller 4400. For example, referring to FIG. 11A, rotation control 1160 and zoom-in controls 1170 and 1180 of the imaging device 200 to bring a paper document 1110 to the center of the image in a composition that includes both the paper document 1110 and a person 1120 are illustrated.

Next to the operation S3546a-1, the exemplary embodiment of the boundary marker acquisition operation S3546a includes an end marker determination operation S3546a-2 in which it is determined whether the obtained character image includes the end marker, and operation S3546a-3 of controlling available resources by the tracking controller 4400 to take the character image as the full character-displayed image when the obtained character image includes the end marker, and to obtain an additional character image that is the image including a next marker and having a character recognition rate of at least a predetermined threshold value by searching for the next marker of the last marker among the boundary marker appearing in the character image when the obtained character image does not include the end marker, and merging the additional character image into the character image to perform the operation from the end marker determination operation S3546a-2 again.

The control of the available resources in operation S3546a-3 includes a control of the gimbal 300, and for example, a control of the gimbal 300 for a book in Korean and English may be a control (for example, a rotation control of reference numeral 1190 in FIG. 11B) that assists the imaging device 200 in scanning from left to right of the area displayed with the characters and from top to bottom of the area.

Further, those skilled in the art will understand that various image stitching techniques may be used to merge the character images in operation S3546a-3. Referring to FIG. 11B, image merging may be performed between two or more images taken at temporally or spatially separated intervals by using overlapping image patterns 1136a and 1136b.

Next to the boundary marker acquisition operation S3546a, the operation S3540a of performing OCR in the exemplary embodiment may include operation of obtaining text by performing OCR (S3468a) on the full character-displayed image, which is a partial image including the image of the object on which the character is displayed, and which is an image including both the start marker and the end marker.

In the meantime, referring to FIGS. 10B and 11C, in a second exemplary embodiment of the operation S3540 of performing OCR, the operation S3540b of performing OCR begins with operation S3542b of extracting image samples from the character-displayed object and, following the operation S3542b, includes operation S3544b of demarcating a boundary line 1130 of the character-displayed area from the image samples.

Then, the operation of performing OCR S3540b includes operation 3546b of performing OCR on the full character-displayed image, which is the image generated by obtaining at least one image pattern 1142a and 1142b that are not located on the boundary line among the image samples as a segmentation marker and merging the character images by using the segmentation marker.

In operation S3546b, the segmentation markers refer to the overlapping image patterns 1142a and 1142b between the two or more images taken at temporally or spatially separated intervals. By capturing the same segmentation markers in different images, image merging, or image stitching, may be done by using the segmentation markers.

Finally, referring to FIGS. 10C and 11D, in a third exemplary embodiment of the operation S3540 of OCR performing, the operation S3540c of performing OCR includes operation S3542c of controlling available resources by the tracking controller 4400 to obtain the object image that includes the start point of the entire characters and has a character recognition rate of at least a predetermined threshold value, that is, to make the image of the object have a predetermined OCR-capable resolution.

As a policy of the tracking controller 4400 performing operation S3542c, a condition may be imposed that the object image have a predetermined OCR-capable resolution, as well as a condition that the object image includes a maximum number of characters at the resolution.

Next, the operation S3540C of performing OCR further includes operation S3544c of performing OCR on an initial sentence area 1152 of the obtained object image.

In this context, the initial sentence area refers to the area occupied by the sentence that is detected to be the first to be placed, considering the normal placement of characters in the language used in the sentence.

For example, in the first execution of the operation S3544c, the initial sentence area may be determined by scanning for punctuation marks indicating a completion point of a sentence, such as ",", ".", "?". When the punctuation mark is scanned, the area from the start character to the punctuation mark may be assumed to be the initial sentence area 1152.

As another example, at the first execution of the operation S3544c, the initial sentence area 1152 may be determined to be the area occupied by a sentence formed of a sequence of characters from the start character until the size of the character changes by a value equal to or greater than a predetermined threshold value when comparing the sizes of the characters sequentially from the start character to the next characters.

As another example, at the first execution of the operation S3544c, the initial sentence area 1152 may be determined to be the area occupied by a sentence formed of characters continuing from the start character until the space between characters changes by a predetermined threshold value or more when the sizes of the spaces between characters are sequentially compared from the size of the space between the start character and the next character.

The operation S3540c of performing OCR then further includes a value of meaningfulness calculating operation S3546c, in which Natural Language Understanding (NLU) is performed on the first text, which is the primary result of the OCR in operation S3544c, to calculate a value of meaningfulness, which is a numerical value of the meaningfulness of the first text.

Next, the operation S3540c of performing OCR further includes operation S3458c of performing an operation from operation S3546c of, when the value of meaningfulness at operation S3546c is equal to or greater than a predetermined threshold value, completing the OCR by taking the first text as the result text, and when the value of meaningfulness is less than the predetermined threshold value, performing OCR on a next sentence area 1154 of the initial sentence area and calculating the value of meaningfulness.

The calculation of the value of meaningfulness may be cumulative, as natural language understanding may be performed in a way of being applied again to the character area having a larger size according to the combination of the sentence on which the OCR has been previously performed with a new sentence, not the way of being applied only to a single sentence on which the OCR has been performed.

To this end, in the operation S3548c, OCR may be sequentially and iteratively performed on new sentence areas including the following sentences present after the punctuation mark of the initial sentence area.

Of course, even though OCR is performed until the last sentence, when the value of meaningfulness does not reach the predetermined threshold value, it may be detected that there is no text by the entire characters.

Thus, by performing the foregoing operations of the present disclosure, the computing apparatus processing captured images of objects may recognize various information of the objects detected in the image.

While the components illustrated in the drawings are illustrated as being realized on a single computing apparatus, such as a portable terminal, for ease of description, it will be understood that the computing apparatus 100 for performing the method of the present disclosure may include a plurality of devices which is interlocked with each other. Thus, it will be apparent that each of the operations of the method of the present disclosure described above may be performed by the gimbal 300 having a communication unit and a processor embedded therein, in addition to a portable terminal, and may be performed by one computing apparatus directly or by supporting, by the one computing apparatus, another computing apparatus interlocked with the one computing apparatus to perform the method.

As described above, the method and the apparatus of the present disclosure, in all of the exemplary embodiments and modified examples, may recognize and track one or more objects using an image, actively obtain information about the object and the environment, and, in particular, obtain state information of the object as an image from a remote distance, determining an interworking object through the image, obtaining higher resolution detailed images of portions of the object from a remote distance, and determining characters printed on the objects or output by other means, such as a display, from a remote distance, thereby achieving an advantage in that it is possible for the portable computing apparatus to enable remote input by using the image.

Based on the above description of the various exemplary embodiments of the present disclosure, it will be apparent to those skilled in the art that the method and/or the processes of the present disclosure, and the operations thereof, may be realized with hardware, software, or any combination of hardware and software suitable for a particular application. The hardware may include a general purpose computer and/or a dedicated computing apparatus or a particular computing apparatus or a special appearance or component of a particular computing apparatus. The processes may be realized by one or more processors, for example, microprocessors, controllers, for example, microcontrollers, embedded microcontrollers, microcomputers, Arithmetic Logic Units (ALUs), digital signal processors, for example, programmable digital signal processors, or other programmable devices, having internal and/or external memory. Additionally or alternatively, the processes may be performed using an Application Specific Integrated Circuit (ASIC), a programmable gate array, such as a Field Programmable Gate Array (FPGA), a Programmable Logic Unit (PLU) or Programmable Array Logic; (PAL), or any other device capable of executing and responding to instructions, and any other device or combination of devices that may be configured to process electronic signals. The processing device may execute an Operating System (OS) and one or more software applications executed on the OS. Further, the processing device may also access, store, manipulate, process, and generate data in response to the execution of the software. For ease of understanding, there is a case where it is described as one processing device is used, but those skilled in the art will recognize that a processing device may include a plurality of processing elements and/or multiple types of processing elements. For example, a processing device may include a plurality of processors or one processor and one controller. Further, other processing configurations are possible, such as parallel processors.

Software may include computer programs, code, instructions, or a combination of one or more thereof, and may configure a processing device to operate as desired, or may independently or collectively instruct a processing device. The software and/or data may be permanently or temporarily embodied in any type of machine, component, physical device, virtual equipment, computer storage medium or device, or transmitted signal wave, in order to be interpreted by a processing device or to provide instructions or data to a processing device. The software may be distributed across networked computer systems and stored or executed in a distributed manner. The software and data may be stored on one or more machine-readable recording media.

Moreover, the objects of the technical solution of the present disclosure, or portions thereof that contribute to the prior art, may be implemented in the form of program instructions that can be carried out by various computer components and recorded on a machine-readable medium. The machine-readable medium may include program instructions, data files, data structures, and the like, singly or in combination. The program instructions recorded on the machine-readable recording medium may be specifically designed and constructed for the exemplary embodiment or may be known and available to those skilled in the computer software field. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. Examples of program instructions may be generated using structured programming languages such as C, object-oriented programming languages such as C++, or high-level or low-level programming languages (including assembly language, hardware description languages, and database programming languages and techniques) that may be stored and compiled or interpreted for execution on processors, processor architectures, or heterogeneous combinations of different hardware and software, or any other machine capable of executing the program instructions, as well as any one of the foregoing devices, so that machine code, bytecode, and even high-level language code that can be executed by a computer using an interpreter are included.

Thus, in one aspect of the present disclosure, the methods and the combinations of the methods described above may be implemented as executable codes that perform each of the steps when performed by one or more computing apparatuses. In other aspects, the method may be practiced as systems performing the steps, and the methods may be distributed in various ways across devices, or all functions may be integrated into one dedicated, stand-alone device or other hardware. In another aspect, the means for performing the steps associated with the processes described above may include any of the hardware and/or software described above. All such sequential combinations are intended to fall within the scope of the present disclosure.

For example, the above hardware devices may be configured to operate as one or more software modules to perform the operations of the exemplary embodiments, and vice versa. The hardware device may include a processor, such as an MPU, CPU, GPU, TPU, coupled with memory, such as ROM/RAM, for storing program instructions, and configured to execute instructions stored in the memory, and may include a communication unit for transmitting and receiving signals to and from external devices. Additionally, the hardware device may include a keyboard, mouse, or other external input devices for receiving instructions written by the developer.

While the present disclosure has been described above with reference to certain details, such as specific components, and by means of specific exemplary embodiments and drawings, which are provided for a more general understanding of the disclosure, the disclosure is not limited to these exemplary embodiments, and various modifications and variations may be made from these descriptions by one having ordinary knowledge in the art to which the disclosure belongs.

Accordingly, the spirit of the disclosure is not to be limited to the exemplary embodiments described above, and the claims of the patent appended to the present disclosure, as well as all equally or equivalently modified variations thereof, will be the to fall within the scope of the spirit of the disclosure. For example, even though the described technologies are performed in an order different from the described method, and/or the described components of the system, the structure, the apparatus, the circuit, and the like may be combined in a different form from the described method or replaced or substituted by other constituent elements or equivalents, the appropriate result may be achieved.

Such equivalents or equivalent variations shall include, for example, logically equivalent methods that are capable of producing the same results as practicing the methods according to the present disclosure, and the spirit and scope of the present disclosure shall not be limited by the foregoing examples, but shall be understood in the broadest sense permitted by law.

MODE FOR CARRYING OUT THE INVENTION

As the described above, the relevant contents are described in the best mode for implementing the present disclosure.

INDUSTRIAL APPLICABILITY

The present disclosure may be used in devices, systems, and the like that process images obtained from an imaging device.

The invention claimed is:

1. A method of processing an image, performed by a computing apparatus including a processor, the method comprising:
   obtaining an image;
   obtaining, from the image, analysis information corresponding to an object included in the image by using an object analysis model; and
   obtaining, from the analysis information corresponding to the object, a character contained in the object by using an OCR model,
   wherein the OCR model performs:
   determining whether the character is displayed on a surface of the object;
   extracting at least one image sample from the object on which the character is displayed;
   determining a boundary line of an area in which the character is displayed from the at least one image sample;
   obtaining, from the at least one image sample, image patterns located on at least one of: (i) the boundary line; or (ii) a boundary point belonging to the boundary line, as a boundary marker;
   generating a character-displayed image including the boundary marker as a partial image included in the image of the object on which the character is displayed, the image of the object being included in the image obtained in the obtaining an image step; and
   performing OCR on the character-displayed image.

2. The method of claim 1, wherein the image sample is an image pattern present at a position of at least one of the boundary line or a boundary point belonging to the boundary line; and
   the image pattern includes at least one of a partial character, a border of the character, a portion of the character, or a background.

3. The method of claim 1, wherein the boundary marker includes at least one of:
   a start marker that is an image pattern corresponding to a start character of the character; or
   an end marker that is an image pattern corresponding to an end character of the character.

4. The method of claim 3, wherein the obtaining of, from the at least one image sample, the image patterns located on at least one of the boundary line or a boundary point belonging to the boundary line, as the boundary marker includes:

obtaining a character image including the start marker and having a character recognition rate of at least a threshold value by using a tracking controller; and determining whether the character image includes the end marker.

5. The method of claim 4, further comprising:

determining the character image as the character-displayed image when the character image includes the end marker.

6. The method of claim 4, further comprising:

when the character image does not include the end marker, obtaining an additional character image including a next marker of a last marker among the boundary marker included in the character image and having the character recognition rate of at least the threshold value by using the tracking controller;

merging the additional character image into the character image to generate a merged character image; and determining the merged character image as the character-displayed image when the merged character image includes the end marker.

7. The method of claim 1, comprising:

after the determining whether the character is displayed on the surface of the object, obtaining an image of the object including the start point of the character and having a character recognition rate of at least a threshold value by using a tracking controller;

performing the OCR on an initial sentence area of the image of the object; and calculating a first value of meaningfulness that is a numerical value of a meaningfulness by performing Natural Language Understanding (NLU) on a first text that is a primary result of the OCR.

8. The method of claim 7, further comprising:

if the first value of meaningfulness is equal to or greater than the threshold value, determining the first text to be a result text that is a result of the OCR.

9. The method of claim 7, further comprising:

when the first value of meaningfulness is less than the threshold value, performing the OCR on a next sentence area of the initial sentence area; performing natural language understanding on a second text that is a primary result of the OCR, and calculating a second value of meaningfulness that is a numerical value of the meaningfulness; and when the second value of meaningfulness is equal to or greater than the threshold value, determining the second text to be a result text that is a result of the OCR.

10. The method of claim 1, wherein the computing apparatus is interlocked with an imaging device and a gimbal, and wherein obtaining the image comprises:

controlling a direction of the imaging device by actuating one or more rotational axis of the gimbal by using a tracking controller; and obtaining the image by zooming in or zooming out of the imaging device by using the tracking controller.

11. A non-transitory computer-readable medium including a computer program, the computer program causing a computing apparatus to perform a method of processing an image, the method comprising:

obtaining an image;

obtaining, from the image, analysis information corresponding to an object included in the image by using an object analysis model; and obtaining, from the analysis information corresponding to the object, a character contained in the object by using an OCR model, wherein the OCR model performs:

determining whether the character is displayed on a surface of the object;

extracting at least one image sample from the object on which the character is displayed;

determining a boundary line of an area in which the character is displayed from the at least one image sample;

obtaining, from the at least one image sample, image patterns located on at least one of: (i) the boundary line; or (ii) a boundary point belonging to the boundary line, as a boundary marker;

generating a character-displayed image including the boundary marker as a partial image included in the image of the object on which the character is displayed, the image of the object being included in the image obtained in the obtaining an image step; and performing OCR on the character-displayed image.

12. A computing apparatus, comprising:

a processor; and a communication unit, wherein the processor obtains an image, obtains, from the image, analysis information corresponding to an object included in the image by using an object analysis model, and obtains, from the analysis information corresponding to the object, a character contained in the object by using an OCR model, wherein the OCR model determines whether the character is displayed on a surface of the object, extracts at least one image sample from the object on which the character is displayed, determines a boundary line of an area in which the character is displayed from the at least one image sample, obtains, from the at least one image sample, image patterns located on at least one of: (i) the boundary line; or (ii) a boundary point belonging to the boundary line, as a boundary marker, generates a character-displayed image including the boundary marker as a partial image included in the image of the object on which the character is displayed, the image of the object being included in the image obtained in the obtaining an image step, and performs OCR on the character-displayed image.

* * * * *